(12) United States Patent
Hastings et al.

(10) Patent No.: US 11,887,266 B2
(45) Date of Patent: Jan. 30, 2024

(54) AUGMENTED REALITY SECURITY SCREENING AND GUIDANCE

(71) Applicant: The Government of the United States of America, as represented by the Secretary of Homeland Security, Washington, DC (US)

(72) Inventors: William Hastings, Billings, MT (US); James Matt Gilkeson, Alexandria, VA (US); Mara Winn, Alexandria, VA (US)

(73) Assignee: The Government of the United States of America, as represented by the Secretary of Homeland Security, Washington, DC (US)

(*) Notice: Subject to any disclaimer, the term of this patent is extended or adjusted under 35 U.S.C. 154(b) by 0 days.

(21) Appl. No.: 18/200,129

(22) Filed: May 22, 2023

(65) Prior Publication Data

US 2023/0377286 A1 Nov. 23, 2023

Related U.S. Application Data

(60) Provisional application No. 63/344,890, filed on May 23, 2022.

(51) Int. Cl.
| | |
|---|---|
| *G06T 19/00* | (2011.01) |
| *G06Q 50/26* | (2012.01) |
| *G06F 3/0486* | (2013.01) |
| *G06T 7/70* | (2017.01) |
| *G06F 3/01* | (2006.01) |
| *G06T 11/60* | (2006.01) |

(52) U.S. Cl.
CPC ............ *G06T 19/006* (2013.01); *G06F 3/017* (2013.01); *G06F 3/0486* (2013.01); *G06Q 50/265* (2013.01); *G06T 7/70* (2017.01); *G06T 11/60* (2013.01)

(58) Field of Classification Search
CPC .... G06V 20/52; G06V 10/25; G06V 2201/05; G01S 13/887; G06T 19/006; G06F 3/017; G06Q 50/265
See application file for complete search history.

(56) References Cited

U.S. PATENT DOCUMENTS

| | | |
|---|---|---|
| 10,042,078 B2 | 8/2018 | Sarraiocco |
| 10,754,418 B1 * | 8/2020 | Ruppert .................... G06T 7/70 |

(Continued)

FOREIGN PATENT DOCUMENTS

| | | | | |
|---|---|---|---|---|
| KR | 20230000188 A | * | 8/2023 | |
| WO | WO-2017186303 A1 | * | 11/2017 | ............. A63F 13/48 |

*Primary Examiner* — Chante E Harrison
(74) *Attorney, Agent, or Firm* — Lavanya Ratnam; Robert W. Busby; William Washington

(57) ABSTRACT

A method to enhance security screening includes generating an augmented reality (AR) interface incorporating scan results from scanning a target in a security scanner. The method displays, to a user of an AR interface, the AR interface mapped to the target and determines guidance including an action relevant to addressing the scan results. The method displays, to the user via the AR interface, the guidance including the action for the user to carry out and monitors user actions. The method displays, to the user via the AR interface, confirmation that the user has carried out the action.

30 Claims, 14 Drawing Sheets

(56) References Cited

U.S. PATENT DOCUMENTS

2007/0235652 A1* 10/2007 Smith .................. G01V 5/0083
  250/363.02
2013/0050199 A1* 2/2013 Chavez ................ G06Q 10/101
  345/419

* cited by examiner

AUGMENTED REALITY SECURITY SCREENING AND GUIDANCE

CROSS-REFERENCE TO RELATED APPLICATIONS

This application is a nonprovisional application that claims the benefit of priority from U.S. provisional application 63/344,890 filed on May 23, 2022, entitled "Augmented Reality Security Screening and Guidance," the disclosure of which is incorporated by reference in its entirety.

STATEMENT OF GOVERNMENT INTEREST

The present invention was made by employees of the United States Department of Homeland Security in the performance of their official duties. The Government has certain rights in the invention.

FIELD

The discussion below relates generally to security screening and procedure guidance.

BACKGROUND

This section provides a brief introduction to the technical subject matter without distinguishing what aspects of the technology are or are not in the prior art. Nothing in this section amounts to an admission regarding the prior art.

Security screening has transitioned to imaging technologies as a primary means of passenger security screening. Imaging technologies improve the technological capability of detecting non-metallic threats. However, security screening is also dependent on physical screening for alarm resolution processes. This dependence can cause some security screening officers to have diminished confidence in the accuracy of the security screening units primarily used for traveler screening.

SUMMARY

In an embodiment, a method to enhance security screening generates an augmented reality (AR) interface incorporating scan results from scanning a target in a security scanner. The method displays, to a user of AR equipment, the AR interface mapped to the target, and determines guidance including an action relevant to addressing the scan results. The method displays, to the user via the AR interface, the guidance including the action for the user to carry out, and monitors user actions. The method displays, to the user via the AR interface, confirmation that the user has carried out the action.

In another embodiment, a system to enhance security screening comprises augmented reality (AR) equipment for use by a user to perform security screening on a target that has been scanned in a security scanner, and a camera system for monitoring an environment including the user and the target. The system includes a computer system with a processing system having a hardware processor configured to perform a predefined set of basic operations by loading corresponding ones of a predefined native instruction set of codes, the predefined native instruction set of codes constituting a set of instructions selectable for execution by the hardware processor. The computer system also includes a memory accessible to the processing system, and an augmented reality (AR) interface controller under control of the processing system. The system includes AR interface logic, stored in the memory, including a sequence of instructions selected from the predefined native instruction set of codes of the hardware processor, adapted to operate with the processing system and the AR interface controller to generate an AR interface adapted to incorporate scan results and display guidance for the user and confirmation of user actions. The system also includes guidance logic, stored in the memory, including a sequence of instructions selected from the predefined native instruction set of codes of the hardware processor, adapted to operate with the processing system to generate and display guidance for the user. The system includes monitoring logic, stored in the memory, including a sequence of instructions selected from the predefined native instruction set of codes of the hardware processor, adapted to operate with the processing system to monitor actions carried out by the user. The system includes a communication system, under control of the processing system, adapted to transmit information used by the AR interface logic, the guidance logic, and the monitoring logic. The processing system is further configured to direct the AR interface logic, the guidance logic, and the monitoring logic to display the AR interface mapped to the target, determine guidance; display the guidance, monitor user actions, and display confirmation that the user has carried out the action.

In yet another embodiment, a tangible non-transitory computer-readable medium has stored thereon computer-executable instructions that, if executed by a computing device, cause the computing device to generate an augmented reality (AR) interface incorporating scan results from scanning a target in a security scanner, and display, to a user of AR equipment, the AR interface mapped to the target. The computer-executable instructions, if executed by a computing device, cause the computing device to determine guidance including an action relevant to addressing the scan results, and display, to the user via the AR interface, the guidance including the action for the user to carry out. The computer-executable instructions, if executed by a computing device, cause the computing device to monitor user actions, and display, to the user via the AR interface, confirmation that the user has carried out the action.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

DETAILED DESCRIPTION

Figure 1:
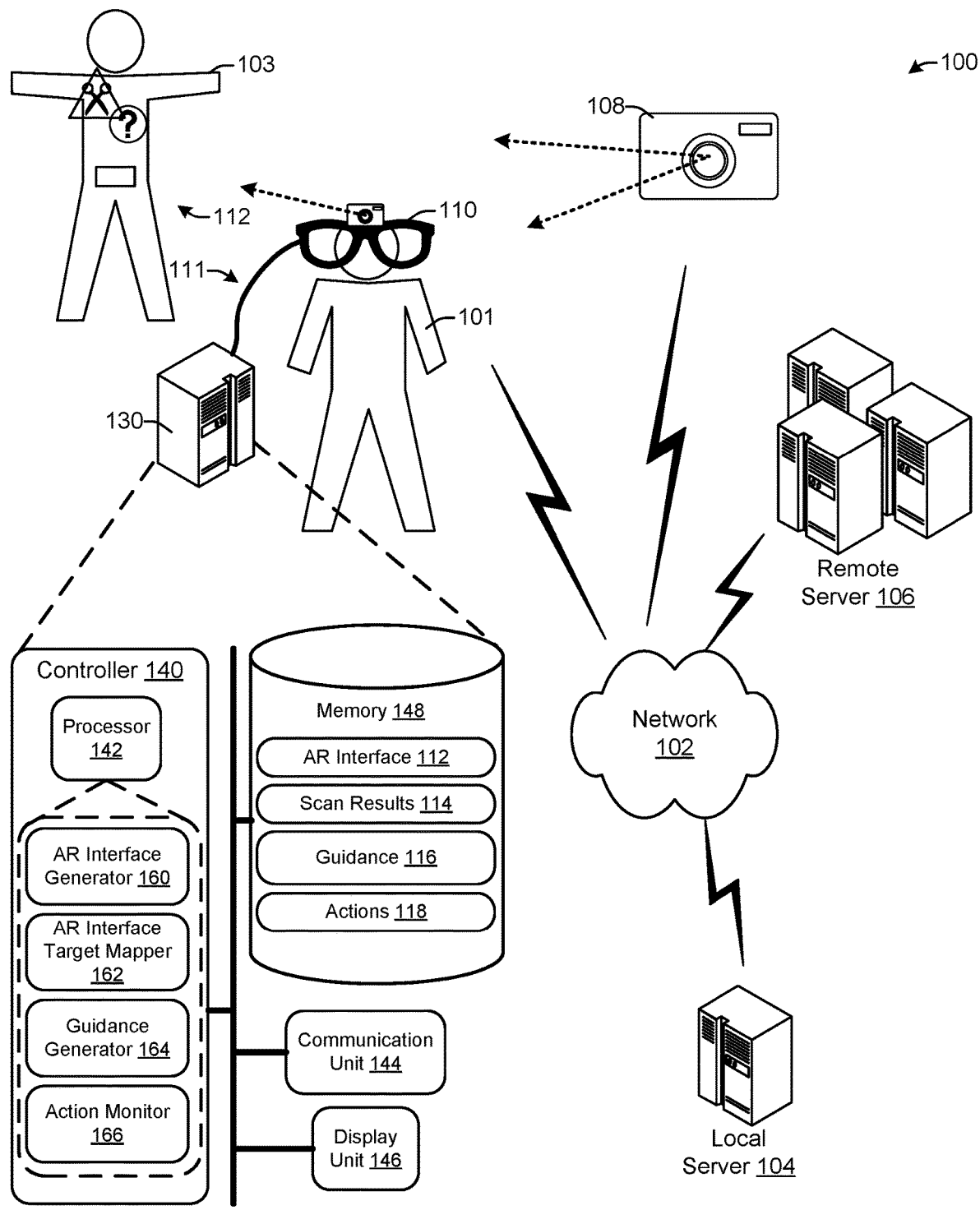
FIG. 1 illustrates a system to enhance security screening according to an embodiment.

Augmented reality is a technology that allows the user to see a computer generated image that is incorporated into their real world environment in real time through a head-up display. Augmented reality display technologies present an avenue to greatly mitigate the dependence on physical screening in the resolution process for imaging unit alarms, and improve the effectiveness of the physical screening in the resolution process when it is needed. To improve upon the detection and resolution capabilities of current and future imaging systems used for passenger security screening, embodiments incorporate augmented reality capabilities, e.g., for paired use with imaging units that produce scan results. This enables a user conducting secondary screening the ability to see an overlaid image of the actual anomaly detected by the imaging unit onto the individual being screened in real time. This is a great improvement over other security screening approaches, such as approaches that rely on an image of bounding box placed over a generic avatar to relay threat information.

An augmented reality security screening and guidance system uses augmented reality (AR) or mixed reality to assist operators (also referred to as users) screening passengers or their property (also referred to as targets). The AR system can receive alarm results from a scanner, such as an AIT scanner. The system generates information, such as an AR interface including an AR overlay, that is displayed to an operator or user via a head-up display (HUD), goggles, glasses, or other types of AR-capable displays or interfaces. The AR system uses the AR interface to overlay or map information, such as alarm results, to real-world passengers or property, so that the user can view the real-world environment through the AR interface with the information mapped over the real-world environment. As used herein, the term "AR interface" describes the mixed display of imagery overlaid on real-world objects such as passengers or baggage. The term "AR interface" can include an operator viewing the imagery and real-world objects through an AR or mixed reality headset or glasses such as mixed reality smart glasses. The term "AR interface" can also include an operator viewing the imagery and real-world objects on a tablet or conventional display.

Embodiments provide various benefits compared to earlier scanning techniques. Embodiments improve the passenger's experience, because they reduce or eliminate physical contacts with the passenger, while streamlining overall screening processes. Embodiments also benefit operators, by building their confidence in the systems when performing needed searches. Unlike earlier scanning techniques, the present embodiments provide information to the operator to enable the operator to perform a one-to-one comparison. Unlike earlier scanning techniques, embodiments provide rich information at-a-glance for operators, far more than the gingerbread passenger indication with blobs for alarms, from earlier scanning techniques. The rich information of the present embodiments correlates the type of alarm with each indication overlaid on the passenger in AR. Thus, the present embodiments allow for operators to clear most alarms through visual inspection alone, without needing additional physical screening or pat down. Embodiments allow operators to visually understand different kinds of scanning results, e.g., to visually distinguish a cufflink from a sequin or buckle when such scanning results are presented to the operator in an AR interface. Operators can easily correlate the scanning results flagged by the system against their real-world objects at the location of the scanning results on the passenger or baggage. Such readily-apparent results enable operators to trust the system and avoid distrust from false alarms. Furthermore, the system directly informs the operator as to the objective of a pat-down, enhancing operator confidence in the system. Embodiments reduce or eliminate the likelihood of operators performing a pat down and missing the alarm object, or otherwise causing the operator to incorrectly think the system is generating false alarms. Accordingly, operators maintain confidence in the system, do not become tempted to assume the system is alarming for erroneous reasons, and maintain the cadence of performing proper screening procedures without rushing through the process. Operators see through the AR interface more directly what triggers a system alarm, enhancing and improving operator understanding of the alarm conditions and situations. Furthermore, using augmented reality head-up displays for security screening operations enables embodiments to show the security officer (user) the image of the anomaly while still maintaining its confidentiality, because only the user looking through the head-up display would be able to see the image. Embodiments allow further tailored views that show the user only the parts of the passenger's image that alerted the automated alarm system, or a bounding box in situations such as an alarm in a sensitive area of the body, instead of the whole body image, to further maintain the passenger's privacy.

Embodiments of the AR interface enhance the user's ability to conduct an effective search of the alarmed area if needed, by enabling the user to visually see what the imaging unit alarmed on, and its precise location on the target in need of screening. Showing the user an image of the alarmed area also mitigates many issues associated with a lack of confidence in the imaging unit, because the user conducting secondary screening can now definitively see what caused the alarm without needing to presume what it might have been. In embodiments, when the user sees an image of an item overlaid on top of the pocket of the passenger through the AR interface and finds no correlating item on the passenger, then the user is more likely to continue the screening process until accounting for the anomaly. Conversely, the same situation using traditional approaches without the benefit of the present embodiments, would likely result in the user knowing only that the imaging unit alarmed on something in the pocket area and, if nothing was found after a pat down of that area, the user would likely clear the passenger assuming that the alarm was erroneous. Such assumptions would prevent the user from performing additional steps of the screening process. However, embodiments described herein encourage full performance of all security screening steps, and provide helpful guidance for their completion.

FIG. 1 illustrates a system 100 to enhance security screening according to an embodiment. The system 100 includes a computer system 130, in communication via network 102 with local server 104, remote server 106, and camera system 108. The computer system 130 is illustrated as being coupled to the augmented reality (AR) equipment 110 via a wired connection. In an embodiment, the AR equipment 110 is coupled wirelessly or via network 102 to the computer system 130. The camera system 108 is illustrated as being coupled to the computer system 130 via network 102. In an embodiment, the camera system 108 is coupled locally via a wired or wireless connection, without use of network 102. The computer system 130 includes controller 140 coupled via a bus to memory 148, communication unit 144, and display unit 146. The controller 140 includes a processor 142 to execute AR interface generator 160, AR interface target mapper 162, guidance generator 164, and action monitor 166.

The memory 148 is associated with AR interface 112, scan results 114, guidance 116, and actions 118.

The computer system 130 includes one or more communicatively coupled communication units 144, processors 142, and memory 148. The communication unit 144 is representative of one or more devices able to communicate information to or from other devices and components including in instances those included in or external to the system 100. Example communication units 144 include but are not limited to wireless modems (such as an 802.11 compliant unit), wired (e.g., Ethernet-ready) or other such communication interfaces, or a cellular communication transceiver. Example 802.11 compliant modems or cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York.

Although a single processor 142 and memory 148 are shown, the computer system 130 can be constructed with multiple processors and memory. The processor 142 is representative of hardware that is capable of processing computer executable instructions, such as a central processing unit that executes a program of instructions. In embodiments, the processing unit (processor 142) implements an operating system which is a set of instructions that allows the processor to perform specialized instructions according to a program run on the operating system or processor platform.

Local memory 148 is representative of a wide variety and types and combinations of memory suitable for storing information in an electronic format. Example memory includes but is not limited to random access memory (RAM), hard disk memory, removable medium memory, flash storage memory, and other types of computer-readable media including non-transitory data storage.

In embodiments, the controller 140 is representative of hardware or software that is constructed to function as described in this disclosure. For example, the controller 140 is a combination of software (such as a program of instructions that is stored in local memory) that is useable by the processor 142 to provide the described capabilities and functions, such as when the embodied instructions are executed by the processor 142 included in the computer system 130. As illustrated and for ease of understanding, the controller 140 includes the processor 142 and the various illustrated generators and modelers, and other logic or features described herein. While shown and described as individual modules, the supporting hardware or software can be configured as an integrated program of instructions to provide the described functionality, such as through the use of application program interfaces (APIs) that permit individual programs to interface to one or more other programs and provide one or more graphical user interfaces (GUIs) output on a display unit 146 to a user to access information or exercise control over the computer system 130 including a visual display output.

The computer system 130 is coupled to the AR equipment 110, which can include a headset and a camera for use by a user to experience the AR interface 112 generated by the computer system 130. In an embodiment, the computer system 130 is miniaturized and incorporated as part of the AR equipment 110 together as a wearable unit. The AR equipment 110, in conjunction with the computer system 130, provides a modified view of the real world to the user 101. The computer system 130 and AR equipment 110 (also referred to herein as AR system 111) digitally augment a contemporaneous view of the real-world with computer-generated sensory input, such as sound, images, video, graphics, or data. For example, the AR equipment 110 includes an augmented reality headset or augmented reality glasses that include one or more lenses or display screens that permit the user 101 to view the real word together with augmented reality elements. Similarly, an augmented reality device can be implemented as part of another device or object. For example, an augmented reality device can be implemented as part of a smart phone or tablet (e.g., a touchscreen of a smart phone can augment a contemporaneous view of the real-world captured by a digital camera); as a windshield or other glass viewing area (e.g., windshield of a vehicle, plane, boat, or train); or as part of a lens (e.g., contact lenses). Similarly, an augmented reality device can include devices that project images onto the eye as augmented reality elements, such as devices that project holograms or other visual representations. An augmented reality device can include a device that modifies brain signals to include augmented reality elements (e.g., an implant to the eye, optical nerves, or brain that add augmented reality elements to vision signals).

The AR system 111 can also include additional equipment, such as a camera system 108, microphone, or other data capturing devices capable of capturing environmental data. For example, AR system 111 can utilize camera system 108 to capture environmental data such as the security screening scanners, the screening operators (users 101), the passengers and their baggage (targets 103), actions performed by the users 101, movement of targets, and so on. Capturing such environmental information enables the AR system 111 to properly overlay augmented reality elements in relation to a real world view as viewed by the user 101 through the AR equipment 110. Moreover, the AR system 111 can utilize cameras, microphones, or other data capturing devices to capture real-world environmental components. In addition, an augmented reality device can include one or more sensors that detect user interaction. For example, an augmented reality device can comprise a camera, optical sensors, clothing, gloves, accelerometers, or other sensors to detect the target 103 and user actions (e.g., movements or hand gestures of the user 101). The AR system 111 can include biometric sensors.

Embodiments of the AR system use cameras to establish the environment and the passengers and other items located in the environment. For example, the system merges information from cameras on the operator and cameras in the environment. An embodiment uses a camera mounted on an AR headset worn by the operator, and compares video from the headset camera to video from environmental cameras to establish the operator's position and viewpoint relative to the environment. Embodiments also can use markers to orient image information (e.g., scanning images from security scanners that display information about an alarm item) with the environment as determined from environmental cameras and operator-carried (e.g., AR headset and body) cameras. In an embodiment, the system can determine where the operator is looking by using the camera built into the operator's AR headset. The system uses the information collected by that AR headset camera to pair or map up the scanning image information (e.g., from AIT scan images) collected for the person or object at which the operator is looking through the AR headset. For example, the operator can be looking at the passenger's body or baggage, paired with a CT scan of the baggage or an HD-AIT scan of the passenger's body. The system uses the AR headset built-in camera to see the operator's environment and determine common orientation features, such as building features, passengers, or other points around the operator that can serve as markers to orient security images to live video feeds. Accordingly, when the operator, passenger, or baggage moves relative to each other, the system tracks the movement and adjusts the AR display of the security images as overlaid onto the passengers, baggage, etc. in AR. In an embodiment, the system can track where objects are in the environment. Using video analytics, a camera-based system tracks who or what object is in which position of the environment, and tracks where those objects move. Accordingly, the system avoids losing track or confusing objects in situations where two objects such as bags or people look similar to each other. Even if an AR headset operator loses sight of a passenger or bag momentarily (e.g., when looking away), the system uses environment cameras or other sensors to maintain knowledge of the status of the passengers or bags. In an embodiment, the system can track people using image recognition and if a person steps out of view of cameras, the system flags the person when re-appearing on camera. The system then prompts operators to perform another scan or search on that flagged person, and again uses the visual imagery of the person as captured by cameras to match up the completed scan and search for that person. The system thereby achieves a failsafe capability in terms of policy, procedure, or passenger. The failsafe ensures that the system matches the correct scan data to the right person. In another embodiment, the system uses broader analytics, e.g., environmental cameras or sensors distributed throughout the facility, beyond the particular AR tracking camera local to the operator. The system uses the broader analytics to track where people are located, and what information is matched with the people, and keeps track of the correspondence between passengers and their information.

Embodiments can make use of AR equipment and systems such as those used in the MICROSOFT® HOLOLENS® system and the like. Embodiments can make use of a companion device (such as a touchscreen tablet), which operators can use to provide feedback or other specific information to the system. The companion device can be mounted at a resolution workstation, which operators can use to enter more specific information. For example, after the operator completes an interaction with a passenger, the operator can use the companion device at the resolution workstation to further categorize or classify objects or items encountered by the system. The companion device can be built into the security technology of the system, or can serve as an added function provided by a given resolution workstation. Embodiments can include a general camera or sentry system to observe the operator and know the position and orientation of the operator in relation to everything else in the environment. In an embodiment, the system uses an overhead camera system to determine that the officer is standing at a specific resolution station. Accordingly, the system prepares that resolution station with information about the passenger or other relevant information the officer can use for security screening processes. The system also can use the overhead camera system to track passengers through that security screening space. Accordingly, the system can keep track of which identity corresponds to which passenger, as the passengers approach an officer or resolution workstation. The system thereby can track and follow the passengers from identification validation through screening processes to the screening officer, while maintaining an identity of the passenger with the capability to display relevant passenger information to the officer as the passengers proceed through the screening process.

Embodiments of the system keep track of who a passenger is using various camera systems, such as an overhead camera system or environmental camera system. The system can keep track of the passenger as part of a security process. The system tracks the passenger when, e.g., security checks a passenger's boarding pass and identification (ID). The security process can involve a biometric authentication, such as the passenger inserting their ID into a Credential Authentication Technology (CAT) system. The CAT system uses the information from the ID to check with databases, such as secure flight, to see if the passenger is somehow flagged. The security process can use an embedded picture or the picture from the ID to perform a biometric verification against the passenger who is presenting the ID at the CAT. Embodiments of the system can communicate with the various components of the security process, such as the CAT system or the external security databases such as secure flight. The system then learns details about the passenger that are relevant to security screening using the AR interface. For example, the system can learn the passenger's risk category and adjust what alarm resolution process to display to the operator. The system can learn an age category of the passenger, and guide the operator through a first resolution processes for a very old passenger or a second resolution process for young passenger, where the different resolution processes might involve different security protocols and procedures for the system to implement and for the operator to follow. Embodiments of the system can associate identification information and other information with the passenger as the passenger moves through the security process, through interfaces with the CAT system or other equipment set up as part of the security process. In an embodiment, the system displays relevant passenger information, as collected from the CAT system and security databases such as the no-fly list, to the operator via the AR interface. Embodiments use a camera system to keep track of a passenger when initially screened, visually recognizing and tracking the passenger and their property through the security process. Accordingly, when the officer uses the AR interface to look at the passenger or their baggage or property, embodiments of the system use the AR interface to display to the operator relevant security-related information about the passenger or their property.

In an embodiment, the system creates a unique biometric token that corresponds to the passenger, e.g., based on the passenger's specific ID and other passenger or travel characteristics. The system creates that new token or system object, and associates it with the passenger or baggage items as recognized by the system. The system can generate multiple such tokens corresponding to multiple different passengers. Accordingly, when the operator uses the system's AR interface to look at the passenger or item, the system accesses the list of biometric tokens, and the system recognizes the image of the passenger and uses the recognized image to select the token corresponding to the image of that passenger. The system then accesses the tokenized information about the passenger to assist the operator in processing the passenger.

Embodiments of the system can use visual recognition of passengers and items. For example, the system can use camera images to create a characterization profile of the passenger or items. If the passenger or item goes off scene (hidden from cameras) or is otherwise obscured momentarily, the system can still track the passenger or item successfully. When the passenger or item comes back into scene, the system uses visual recognition on the passenger or item to determine which passenger or item matches based on earlier footage. In an embodiment, the camera systems are configured to minimize or eliminate blind spots, and to create overlapping views such that when one camera view is obscured, at least one other camera view maintains tracking on the passenger or item. The system can perform camera tracking through the entire security process.

The AR system 111 generates and presents to the user 101 the AR interface 112, illustrated in FIG. 1 as being overlaid on a target 103 illustrated as a passenger. In embodiments, the target 103 is an item such as baggage or clothing that is subject to security screening. The AR interface 112 includes digital items produced by the AR system 111 that modifies a view of the real world. Augmented reality elements include digital images, digital video, digital renderings, or digital audio or sound provided by the AR system 111. The AR interface 112 is shown overlaying digital indications of a known hazard, a benign object, and an unknown object over specific areas of the target 103. The AR system 111 overlays the digital information on top of real-world environmental components such as target 103. Real-world environmental components include actions, objects, sounds, characteristics, or things in the real world. Actions include changes recognized by the AR system 111, such as the target 103 assuming a recognized pose, or the gloved hands of the user 101 patting down an area of the target 103 corresponding to an indicator overlaid on the target 103. Real-world environmental components include engaging in particular activities (e.g., motions by the target 103 that indicate properly complying with scanning instructions or performing known suspicious actions) or interacting with particular products (e.g., placing an item into a security scanning bin).

The AR system 111, including camera system 108, captures environmental data. The environmental data refers to data captured by a computing device 130, AR equipment 110, or camera system 108 regarding a real-world environment. In particular, environmental data can include image data, video data, audio data, temperature data, location data (e.g., geolocation or GPS), or biometric data captured by AR system 111. The system 100 can utilize such environmental data to identify one or more real-world environmental components, such as a target 103 undergoing secondary screening as a result of the target 103 having previously alarmed during initial security screening. The initial security screening can involve scanning the target 103 in millimeter wave scanning, metal scanning, X-ray scanning, or the like and producing scan results 114, such as X-ray data corresponding to a dense metallic object, that the AR system 111 can incorporate into the AR interface 112 as a digital object overlaid onto the target 103. The AR system 111 can draw source data from various databases and local or remote sources of data, whether stored on computer system 130, or retrieved over network 102 from local server 104, remote server 106, or from a device itself (e.g., via a networked scanner).

The computer system 130 executes the various modules associated with processor 142. The AR interface generator 160 generates the AR interface 112 incorporating scan results 114 from scanning a target 103 in a security scanner. For example, the target 103 undergoes scanning in an Advanced Imaging Technology (AIT) scanner such as a millimeter wave (mmW) scanner and alarms due to the mmW scanner flagging a known hazard alarm item carried by the target 103, a known benign object carried by the target 103, and an unknown object carried by the target 103. The mmW scanner produces scan results 114 that depict the various flagged objects relative to the target's body, establishing relative location relationships between where the objects are located relative to the target's body. The AR system 111 receives such scan results 114, e.g., via network 102 in communication with local server 104 which is in communication with the mmW scanner. The target 103 is then directed to secondary screening where the AR system 11 and user 101 can perform the secondary screening. The AR interface generator 160 receives the scan results 114 for use by the AR interface target mapper 162.

The AR interface target mapper 162 receives environmental information sensed by the camera system 108 and the AR equipment 110, and uses the relative location information in the scan results 114 to map digital representations or indications of the alarm objects onto the real-world body of the target 130. The user 101 may then interact with the target 103 while viewing the various objects mapped onto the target 130 through the AR interface 112. In an example, the AR interface target mapper 162 uses posture recognition software to recognize a body arrangement of the target 103, establishing relative positions of the body and limbs of target 103. The AR interface target mapper 162 then uses the relative positional information from the scan results 114 to overlay the various objects onto the target 130, and move the overlaid objects corresponding to movement of the target 103 and changes in the point of view (POV) of the user 101.

The guidance generator 164 recognizes various aspects of the scan results 114, and determines an action that is relevant to addressing the scan results, and displays the guidance 116 to the user 101. For example, the guidance generator 164 determines that the scan results 114 indicate an object is a known hazard (scissors). The guidance generator 164 then identifies which instructional guidance corresponds to resolving the presence of scissors carried by the target 103. The guidance generator 164 then displays the instructional protocol (guidance 116) for the user 101 to carry out to resolve the detection of the scissors. For example, the AR interface 112 overlays the protocol including specific actions for the user 101 to perform. The AR system 111 detects the user's actions, responsive to displaying the guidance 116, via action monitor 166.

The action monitor 166 monitors and analyzes the target 103 and the user 101 to determine whether the user 101 has carried out an action 118 associated with the guidance 116. For example, the action monitor 166 uses object recognition to identify blue examination gloves worn by the user 101 performing secondary screening actions. The action monitor 166 determines whether the gloves overlap with the location of the scissor hazard, and reveal at least a portion of the scissors object. The action monitor 166 determines whether the scissors are moved away from the target 103. The action monitor 166 then displays confirmation that the user 101 has carried out the action 118 set forth in the guidance 116, to safely resolve the alarm associated with the scissors object flagged in the alarm results of the scan results 114 provided by the mmW scanner previously scanning the target 103.

Figure 2:
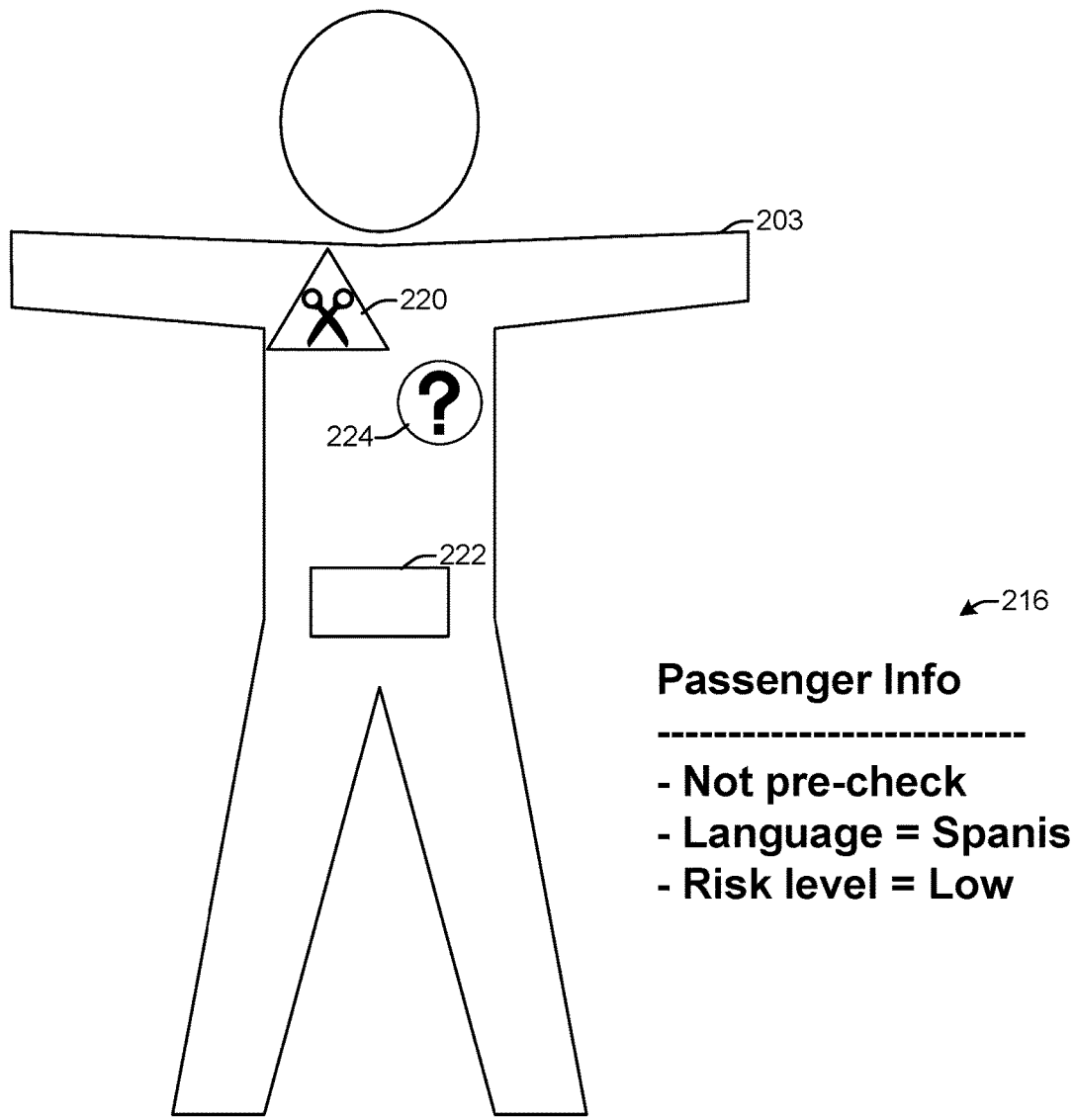
FIG. 2 illustrates an AR interface viewing a target with overlaid objects and guidance to enhance security screening according to an embodiment.

FIG. 2 illustrates an AR interface 212 viewing a target 203 with overlaid objects 220, 222, 224 and guidance 216 to enhance security screening according to an embodiment. The overlaid objects include an alarm object 220, a benign object 222, and an unknown object 224.

The AR interface 212, also referred to as AR overlay, enables operators to view and screen the passengers or property with the context of displayed system information, such as alarm results. The system maps the information or alarm results directly onto or into the passengers or property by adjusting the AR overlay to match positions and movements of the passengers or property relative to the operator's view. This enables operators to verify the geometry of real-world physical items found on the person or property, e.g., by the system comparing the physical items against scanner results (alarm items) overlaid by the system. The system thereby enables operators to visually confirm whether physical items correspond to alarm items using the AR overlay, even if a manual pat-down is not performed. Embodiments of the system can overlay a high-detail 3D rendering of the image of an alarm result, directly over the specific portion of the passenger's body. For example, the system can use the AR interface to project a rendering of the image of an alarm item over the specific part of the wrist of the passenger, e.g., directly over the passenger's cufflinks. Upon viewing such AR results, the operator readily determines through visual inspection that the alarm item corresponds to a false alarm from the passenger's cufflinks, without a need to perform a manual pat down. Such AR embodiments are more efficient for screening operations, compared to previous solutions. A previous solution might involve displaying a generic alarm indication over the entire arm or wrist of the passenger. Without seeing specifics of the alarm item or what specifically to look for on the arm, the operator would then need to perform a manual pat down of the entire arm. Unlike such previous solutions, embodiments of the present system enable the operator to see specific details of the alarm item before and during a pat down, overlaid directly onto specific locations of the person of the passenger (or baggage item).

The system can automatically identify or categorize multiple objects, e.g., a belt buckle, a cufflink, a knife, scissors, unknown objects, and so on. The system provides the operator with an AR user interface displaying a given item (e.g., an item the system recognizes as a cufflink). The system allows the operator to provide interactions and confirmations about the item, e.g., that the item is benign. With dangerous items or weapons, such as a knife, the system can alert the user about a weapon carried on the person, and provide instructions to the operator as to procedures how the operator should start the resolution process for the weapon. The system can prompt the operator with specific instructions on a particular order in which to resolve one or more scan alarms, and inform the operator of specific precautions to take when resolving each alarm. The system can prompt the operator to provide additional information to help the system categorize, identify, and generally know more about that particular item. The system correlates such feedback with the item and also confirms that the scan results (e.g., CT scan or AIT scan) correspond to the items. The system digitally overlays the scan results on the items and learns that the scan results correspond to the visual appearance of such items as captured in AR or other cameras, based on the confirmation of the operators. In an embodiment, the system interprets the operator's lack of correctional feedback as confirmation that the system identification of the item is correct. The system can include forward-facing cameras to help the system determine a spatial relationship between the real-world objects and the AR interface overlay. The cameras also help the system capture information about the physical aspects of the objects. The operator helps categorize the objects and teach the system what the object was through the VR interface. Such feedback helps the system improve performance on future analyses.

The system can provide guidance or other instructions to the operator discreetly via the AR interface, including during manual pat-downs or other procedures. The system can inform the operator how to perform a specific procedure associated with an alarm corresponding to a particular sensitive location on the passenger's person.

Embodiments can use several different approaches when determining how to display underlying scan result imagery, e.g., when overlaying such results onto the passenger in the AR environment. In an embodiment, the system determines (e.g., based on a privacy level of the body zone proximate to the alarm result) to display the actual scan image data of the alarm result. For example, the system can display multiple instances of the item: a scan image of the specific item off to the side and zoomed in, removed from rest of the passenger to avoid distractions, and also overlaid onto the passenger to enable the operator to visually confirm what on the real-world passenger triggered the alarm, based on the detailed image data as displayed. In another embodiment, the system shows an outline of the scan image of the item that alarmed, where the general outline replaces the actual image of the item to enable operators to discern details of the item, while obscuring any details of underlying portions of the passenger's body that may be revealed in the full scan imagery. In yet another embodiment, the system does not display the scan imagery or an outline of the item depicted in the scan imagery. Rather, the system highlights the body area of the passenger that triggered the alarm.

In various embodiments, the system could alarm on a cufflink, determine that the cufflink is located in a body zone without privacy concerns, and therefore provide the full scan imagery with data and details of the cufflink object overlaid on the passenger. In another embodiment, the system can display an outline of the object from the scan imagery, overlaid onto the passenger. Such approaches enable the system to provide the operator with the ability to visually match up the scan imagery of an item that alarmed with the corresponding real-world portion of the passenger or object undergoing scanning. The system can adjust different levels of clarity or detail of the underlying scan imagery. The system can also highlight the passenger's entire wrist, and provide guidance to the operator that the operator needs to search that highlighted area of the passenger's body. The system does not need to reveal specific details on the item that triggered the alarm, and can provide guidance to the operator to properly navigate through the alarm resolution process. The system can tailor the specific steps and alarm resolution process to be specifically relevant to the alarm item.

In yet another embodiment, the system enables various options depending on choices the passenger makes. For example, the system can begin a resolution process by presenting a generic alarm indication. The system prompts the operator with options to present to the passenger, directing the operator to ask the passenger which option the passenger would prefer. For example, the operator can ask the passenger if the passenger consents to reveal the scan imagery of the alarm area for potentially resolving the alarm issue without the operator needing to touch the passenger. Embodiments can incorporate such passenger input into the different resolution processes that the system presents to the operator.

Embodiments of the system use computer vision AI to identify specific items or objects viewed by the operator, such as recognizing hands and whether the officer needs to perform a swabbing or sampling of the hands. The system can use the AR interface to specifically highlight and show what parts of the passenger or baggage need to be sampled. The system also can provide specific guidance, e.g., in the form of text overlays, as to what parts of the passenger or baggage needs to be sampled. The system also provides confirmation and reinforcement that the operator is carrying out the various procedures fully and correctly. The system can use the AR interface to discreetly inform the operator that additional tasks need to be performed, or to prompt the operator to relay instructions to the passenger.

The system uses the AR overlay to inform the operator audibly or visually as to what progress the operator is making, enabling the operator to comply with pat-down protocols, avoid privacy violations, and fully complete needed procedures. For example, the system overlays a yellow patch on areas of the passenger or property that need to be patted down, sampled, or otherwise interacted with. The system progressively changes areas to green, as the operator interacts with those areas. The system uses the transition from yellow to green to show progress of the pat down procedure, and to inform the operator when the operator has fully completed the pat down. The system can then instruct the operator as to next steps.

The system can provide instructions or other information to the operator as a digital overlay in the view of the AR interface. The system can display, e.g., to the side of the AR display, information about the passenger undergoing screening. Such passenger information can be relevant to the screening process, e.g., to assist the operator in conducting a pat down safely and efficiently. For example, the TSA system may assign a designation to the passenger. The TSA system designation informs the operator as to what type of resolution process the operator should use to screen the passenger. For example, a passenger who the TSA system designates as being TSA precheck, would need a first type of resolution process. However, a passenger who the TSA system designates as high-risk would need a second type of resolution process stricter or more elaborate than the first type of resolution process. The system can convey the information about the passenger to the operator in a consistent manner, so that the operator can readily appreciate that the passenger information corresponds to the passenger, and not some other object viewed through the AR interface.

Figure 3:
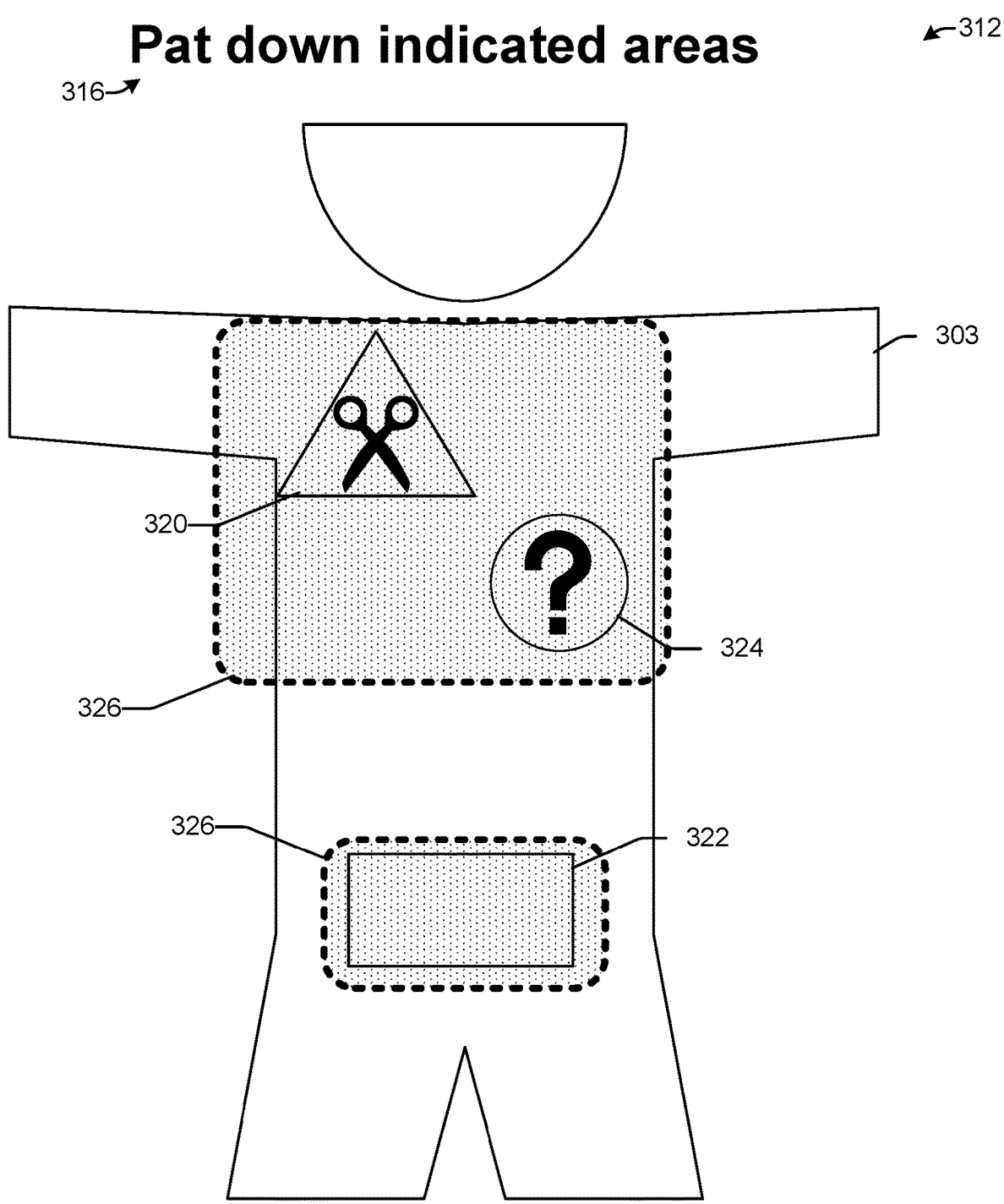
FIG. 3 illustrates an AR interface viewing a target with overlaid objects and guidance to enhance security screening according to an embodiment.

FIG. 3 illustrates an AR interface 312 viewing a target 303 with overlaid objects 320, 322, 324 and guidance 316 to enhance security screening according to an embodiment. The AR interface 312 also includes progress indicators 326, to serve as intuitive visual indicators to assist the user in patting down areas corresponding to the alarm object 320, benign object 322, and unknown object 324.

The guidance 316 instructs the user which particular areas of the target 303 to pat down, enabling the user to focus the pat down on critical portions of the target 303, without needing to pat down the entire body of the target 303. The AR interface 312 can overly the progress indicators 326 as colored highlight boxes, which the AR interface 312 selectively removes in response to the user performing a pat down, providing helpful feedback and confirmation to the user during the process.

Figure 4:
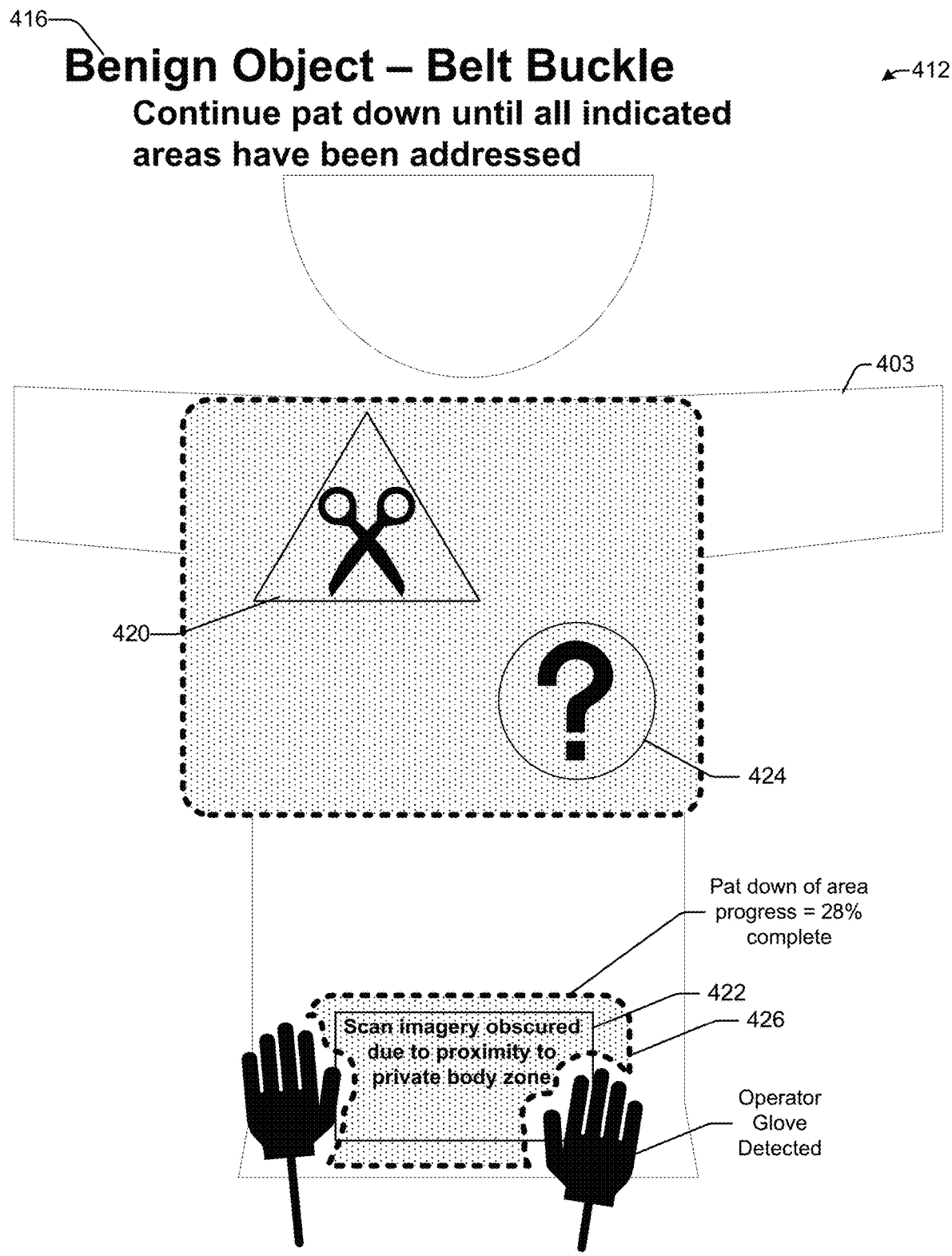
FIG. 4 illustrates an AR interface viewing a target with overlaid objects and guidance monitoring user actions to enhance security screening according to an embodiment.

FIG. 4 illustrates an AR interface 412 viewing a target 403 with overlaid objects 420, 422, 424 and guidance 416 monitoring user actions to enhance security screening according to an embodiment. The progress indicator 426 is partially removed, to serve as an intuitive visual indicator as to what portions of the target 403 remain to be patted down to assist the user in patting down areas as indicated by a protocol for pat down procedures of the indicated alarm object 420, benign object 422, and unknown object 424.

The AR interface 412 provides detailed guidance 416 very specific to the particular situation of the target 403. In the illustrated example, the target 403 has three items to check, and the AR interface 412 includes helpful guidance particular to a recognized item to check, e.g., a benign object 422 corresponding to a belt buckle. Additionally, the AR interface 412 detects that the belt buckle is located near a sensitive area for the target 403, and obscures the underlying scan imagery due to the proximity to a private body zone of the target 403.

The system uses AR or virtual reality (VR) to provide guidance such as instruction or feedback to the operator. The system can evaluate operator actions, and provide feedback in response to operator actions. The guidance may be customized and tailored to instruct the operator how to specifically address or resolve a given procedure or security process. For example, if the system alarms on a region of a passenger's body requiring a certain protocol, the system provides instruction and feedback to the operator on how to carry out the process. The system also provides such guidance regarding the progress of the operator, informing the operator while the operator performs and completes the process. In an embodiment, the system alarms on an object near a sensitive part of the body. The system avoids displaying sensitive portions of the imaged passenger's body, e.g., by not displaying to the operator details of the object or its background (the passenger's body). Accordingly, embodiments can respect privacy concerns while still indicating the object's location on the passenger. The system indicates a need for a manual pat-down, but continues to interact with the operator during the manual pat-down. The system instructs and monitors progress of the operator during the pat-down (using analytics, color coding, and the like which the system displays via the AR overlay). The system tailors the instruction based on the monitoring.

In an embodiment, operator interactions with passengers and items (such as swabbing, pat downs, and the like) are performed by operators wearing personal protective equipment (PPE) including gloves. The system detects and tracks operations performed by the operator's gloves. The system uses various techniques to detect gloves, including color detection where the system detects hands of a solid blue color of the glove, or the system detecting that the hands are a different color than other skin of the operator (arms or face). Embodiments also can perform pose detection to identify the operator's hands and fingers (whether the operator is bare-handed or gloved), and determine that the hands belong to the operator and should be tracked based on the orientation and position of the hands relative to the AR headset camera. The system tracks the operator's hands and uses them as a distinct visual indication of what actions the operator is performing, tracking where the operator's hands have been relative to the item or passenger with which the operator is interacting. The system uses AR to marry the real-world object as viewed by the operator with scanning results of the object such as a CT scan image or AIT image. The system uses the various camera feeds to track whether the operator interacts with the real-world object that correlates to the CT scan image data or AIT image data. For example, an AIT scan detects an unknown object on the back of a passenger and designates that area of the passenger as an alarm area. The passenger undergoes secondary screening based on the operator performing a pat down on the passenger. The system tracks the position of the passenger, and tracks the hands of the operator. The system overlays the AIT scan image data over the real-world passenger as viewed through the AR interface used by the operator. The system uses the AR headset of the operator to track what parts of the passenger's body the operator's hands have touched. The system provides real-time feedback to the operator as to the progress of the pat down. In an embodiment the system progressively changes a color overlaid on the area of interest as the operator's hands pass over the area. In another embodiment, the system progressively clears an alarm indication overlaid on the passenger in AR, as the operator's hands touch the areas of the passenger corresponding to the alarm area.

The system can track the operator's progress when performing various procedures or processes. The system can, e.g., use pose detection or glove recognition to determine whether the operator is performing a pat down procedure correctly. In an embodiment, the system highlights multiple areas and informs the operator to first pat down a first area, and monitors the operator to confirm the first area has been patted down. The system can visually confirm the operator is carrying out the procedure. Upon visual confirmation, the system then informs the operator to pat down the next area, and so on. In an embodiment, the system monitors operator's actions carried out with property. For example, the system directs the operator to swab or sample a first part of the item, and observes the operator through the AR system to determine whether the operator has completed the swabbing of the first part of the item. Once completed, it says to sample a next part of the item. Accordingly, the system provides an intuitive mechanism to instruct the operators to carry out procedures. Because the system is capable of stepping through discrete steps of the procedure and confirming completion along the way, the system is capable of walking operators through even very complex and lengthy procedures, regardless of the level of training of the operator for a given procedure. The system also can use visual checklists displayed to the operator through the AR interface. The system allows the operator to indicate to the system when a checklist item is completed, and the operator is ready to move to the next steps. Embodiments therefore provide automatic techniques to carry out procedures that are more intuitive and provide fail-safes to ensure that the operator completes a given step before moving on to next steps. In an embodiment, the system checks whether the operator misses a spot (e.g., during a passenger pat down, or when swabbing or sampling an item), and the system can re-prompt the operator with a message that the operator missed a spot.

In an embodiment, the system uses AR or mixed reality to overlay an entire scanning image (e.g., AIT scan image) of a person onto the real-world view of the person through the AR interface. In another embodiment, the system highlights a portion of the person corresponding to a location of a scanning image alarm. This enables the operator to view through the AR interface that the corresponding portion (e.g., a forearm) is highlighted (e.g., in a color such as red). The system uses AR interface to highlight the portion of the body to indicate a general area of the passenger's body that needs resolution due to a security alarm. As the operator touches the highlighted portion of the passenger's body, the system tracks the touching and adjusts the image of the highlighted portion. In an embodiment, the system changes the highlighted color from red to green where the system detects that the operator's hands have touched. In another embodiment, the system removes the highlight as the operator touches the highlighted areas, to indicate in the AR interface that the touched portions have been searched. Once all the highlighted areas are touched, the highlight is removed, indicating that the operator has completed the secondary search of the previously highlighted portion. A similar approach can be used for areas that need operator interaction, such as areas of passengers or luggage that need to be swabbed for a trace detector. Embodiments can help guide an operator through, e.g., a full-body pat down, enabling the system to track progress of the pat down and serve as confirmation and a failsafe that the entire body was patted down fully and correctly.

Embodiments respect the privacy of the passengers. The system can adjust and vary the amount of detail displayed to the operator. For example, raw scanning information or images of a passenger (from X-ray scanning equipment such as a CT scanner or HD-AIT scanner) can contain private images of the passenger. Accordingly, the system intelligently adjusts how the raw scanning information is displayed to the operator through the AR interface, to respect privacy. In an embodiment, the system uses pose detection to identify what body zone the raw scanning information corresponds to. The system determines whether the body zone corresponds to a need for increased privacy, such as areas near the groin or chest. If there is a need for increased privacy, the system obscures, blurs, outlines, or otherwise prevents the raw scanning information from being fully revealed. Accordingly, the system can overlay the blurred or obscured scanning images onto the passenger when viewed by the operator through the AR interface. For example, if the system alerts on an unknown object on the wrist (e.g., an unknown cufflink), the system can display the actual raw scanning image data (e.g., HD-AIT image data) of the unknown object overlaid on the passenger's wrist in the correct position corresponding to its real-world location. The system recognizes the passenger's wrist as a body zone that does not need enhanced privacy. Accordingly, the system is able to provide the operator as much information as possible about the unknown object. Such information (actual scan data imagery, accurate mapping to body area in real-time, overlaying the scan data imagery to the correct real-world location on the passenger) enables the operator to readily correlate the scan data imagery with the real-world object that generated that imagery, using visual senses while viewing the data through the AR interface. Thus, the operator does not need to touch the passenger to feel for the item, because the scan results map directly onto the real-world cufflink in a visually distinct manner when viewed through the AR interface. In another example, the system can scan a belt buckle, but overlay a blurred scan data image onto the real-world belt buckle. The system can use blurred or otherwise obscured scan data imagery when overlaying in the AR interface, because the system detects the belt buckle being located in a proximity to the groin area, which the system can consider to be a body zone with enhanced privacy. In other embodiments, the system can use a smaller zone for the groin area, and classify the belt buckle location as corresponding to the stomach area, which the system can consider to be a body zone without enhanced privacy. Accordingly, the system can adjust a sensitivity and proximity for what are considered privacy-sensitive areas of the passenger's body, to respect the passenger's privacy and avoid displaying detailed body data that should be treated as private. In an embodiment, the system overlays a generic body zone indication onto the passenger's body corresponding to the location of the alert on a private part of the passenger's body. The system thereby provides an indication that something has alarmed at that location of the passenger's body. The system also can provide guidance and instructions as to the resolution process the operator is to follow in order to resolve the specific type of alarm item. The guidance and instructions can be tailored to address the specific details of the underlying scan data (e.g., weapon resolution procedure that may be different than a medical device resolution procedure), even if such details of the alarm item are not visually revealed to the operator. For example, the system displays a text checklist including steps of a resolution process the operator needs to follow, where the system determines with or beyond a threshold confidence level that the underlying scan results correlate to a medical device associated with a specific resolution process. The system then indicates to the operator through the AR interface that the operator should offer the passenger a private screening, to complete the security resolution process for the medical device.

Figure 5:
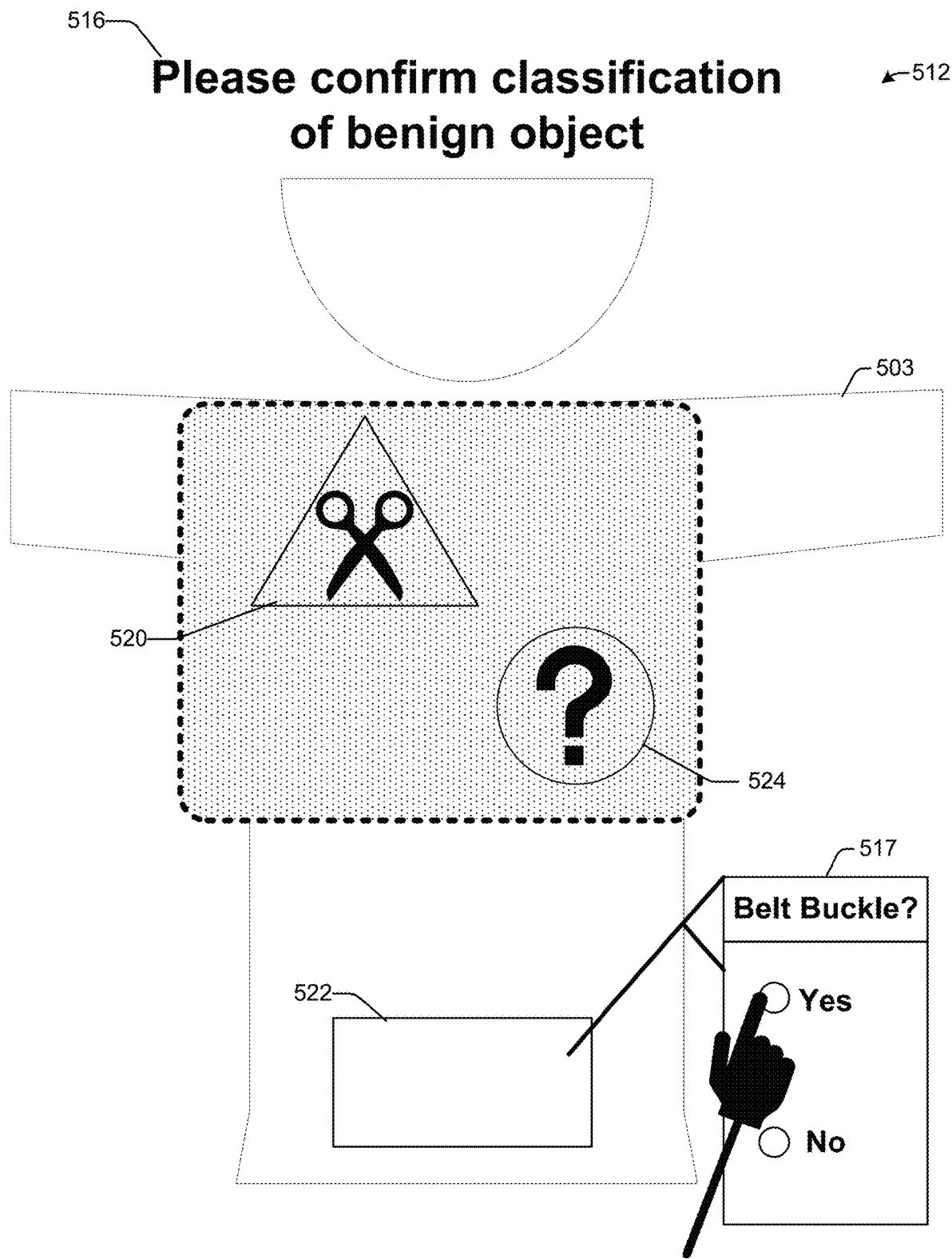
FIG. 5 illustrates an AR interface viewing a target with overlaid objects, guidance, and a dialog to enhance security screening according to an embodiment.

FIG. 5 illustrates an AR interface 512 viewing a target 503 with overlaid objects 520, 522, 524, guidance 516, and a dialog 517 to enhance security screening according to an embodiment.

The AR interface 512 provides guidance 516 that helps the user immediately appreciate that the system has recognized benign object 522, and requests confirmation from the user. The AR interface 512 prompts the user with a dialog 517 requesting input. The user gestures to submit feedback "Yes," to confirm the AR interface 512 made a correct recognition. The AR interface 512 therefore learns and improves over time by collecting and assimilating such feedback from users in the field encountering objects and improving system recognition with use.

The system accepts and learns from operator feedback regarding details of alarm resolution results. For example, the system can prompt the operator for details that are apparent to the operator viewing visuals of the passenger or property with overlaid AIT alarm results. Operators provide input into the system such as confirming whether an alarm result corresponds to a prohibited item or false alarm, or whether the system correctly identifies an object. The system learns and revises its algorithms based on results collected over time, gaining insights over the long term.

Over time with use, embodiments can learn and revise classifications and decisions. Operators use the system and train the system with associated scanning images (AIT, CT, and the like) from real-world situations. The operator performs a bag search using the system's AR overlay. The system prompts the operator for feedback, asking the operator to associate the imaged object with the real-world object. The system asks the operator to further classify the object. For example, the system can encounter a laptop computer that frequently triggers a scanning alarm. Over time as the system is exposed to more incidents involving the laptop, the system is able to further characterize the laptop and save information about the real-world image data (photographic and scan-based) associated with the laptop. The system can prompt the operator for feedback, in real-time during the screening procedure involving the laptop, or after the screening procedure as a follow-up. The system prompts for annotation or feedback regarding details of the item, and also feedback regarding details about the alarm and what factors influenced whether the system alarmed on the item. The system asks the operator to confirm that the item is benign. Accordingly, the system improves its accuracy in determining that this object is benign, and incorporates data collected from multiple encounters of the same type of item over time, including operator feedback and confirmation. By incorporating such feedback, the system drives down false alarm rates.

The system can use such data collection, feedback, and confirmation over time when performing on-person screening, such as when encountering clothing or embellishments including studs or sequins. The system can map the alarming area of the passenger (e.g., clothing or embellishments) with what is sensed by cameras in the real world. The system can present such fused images to the operator, and request feedback from the operator regarding whether the alarm condition triggered on a benign feature and therefore should not trigger for such benign items under such circumstance in the future. Generally, an AIT scanning system may not be able to definitively confirm the benign nature of scan results (e.g., based on the AIT image that the AIT scanning system obtains). However, present embodiments can use real-world camera imagery and scanning imagery together, to match up camera imagery with scanning results. Accordingly, when the system encounters challenging clothing or embellishments such as sequins, the system resolves any uncertainty from the AIT scanning results by fusing the AIT scanning results with camera imagery to determine an alignment between a visual image of a sequin and the uncertain AIT scanning area. The system can request confirmation from an operator, viewing the AIT scanning results overlaid on the live passenger's clothing, to confirm to the system that the sequin results are benign. Accordingly, the system over time learns to recognize that the particular type of AIT scanning results, if they correspond to images of sequins in fused results, corresponds to a benign scanning outcome that does not need a manual inspection or an alarm condition.

Embodiments of the system can receive feedback from the passengers or operators, including other operators that may not be using the AR interface. Such operators may be local or remote (e.g., communicating over a network with the system and AR interface). The operators may interact with the system or view the contents of the AR interface by using a tablet with a touchscreen to provide feedback, or by using a conventional non-AR display with mouse or other interface to provide feedback. Embodiments also enable the operator to provide AR input based on an interactive gesture control. For example, the system may not recognize a benign belt buckle. The system can prompt the operator for feedback on details regarding the belt buckle. The operator also can provide feedback without being prompted. For example, the operator can hold up a hand, and perform a hand gesture which the system recognizes. Such gestures can be customized or varied per operator preference, and can also be standardized for all operators. In an embodiment, the hand gesture is the operator performing a "touching" motion with the hand, as though tapping on a touch-screen, but performing the gesture in mid-air without touching a screen. The system detects the operator's hand gesture. The operator gestures as though tapping on the belt buckle as viewed through the AR interface. The operator does not need to physically touch the belt buckle, because the system is configured to detect the hand gesture and identify what object the operator is selecting as viewed through the AR interface, whether or not the operator ends up physically touching the belt bucking in the real world. The system enables the operator to touch objects via AR interface gesture, or real world physical touching, based on posture detection of the operator's hands or gloves. The operator performs the gesture to touch the object (e.g., belt buckle), and the system responds by using the AR interface to display various operator options that are relevant to the object. The operator virtually touches the object through the AR interface, or actually touches the object, to inform the system that the operator is interacting with the object, whether to provide feedback, classification information, or to obtain from the system more information about the object. Accordingly, embodiments of the system allow for quick, useful, and convenient ways for the operator to interact with the object and the system nonverbally. The nonverbal interactions allow the operator to maintain security, without observers being able to see or determine what the operator is doing.

In an embodiment, the operator performs a gesture by holding up a hand, and tapping the index finger and thumb together. The system correlates the AR interface of the operator, and the AR view of the operator, to determine what the operator's fingers are positioned over in the AR interface. The system interprets the gesture as a click or selection of the object in the operator's field of view. The system can use AR headsets that have cameras incorporated in the headset. The system also can rely on other cameras mounted on the operator (e.g., chest camera) positioned throughout the environment. The system can use such cameras to know where and how to overlay AR interface information onto the view of the operator. The system can use such cameras to recognize what virtual objects the operator is interacting with when performing procedures or making hand gestures related to what the operator is viewing through the AR interface. The system can make use of gestures that involve specific hand motions that are not typical for operators outside of the work environment. Such gestures can be unique to the system, which enables the system to recognize such gestures with higher fidelity and higher accuracy knowing that the operators are making such gestures intentionally. Other gestures the system can use include the operator putting their fingers together quickly to select or prompt. The system also allows the operator to interact with virtual buttons, e.g., where the system creates a virtual option, whose corresponding button pops up to the side of the passenger whom the operator is screening. The operator can position their hand over the virtual button to select the button, then make a click gesture to select that button and its corresponding option or action. The system also supports gestures that enable the operator to select and drag items. For example, the system can prompt the operator with a label such as belt buckle and provide various categories. The system allows the operator to drag the item or label to a specific category, to categorize the item with a particular category or attribute etc.

Embodiments of the system enable the operator to enter information, such as information about a given object, item, or passenger. The system can include intelligence, such as pose detection, to identify a zone of the body. The system also can include intelligence to determine a subset of items that are likely to be found in the body zone. For example, the system can determine that in the body zone of the passenger's waist, a belt buckle is an object that is likely to be found. Accordingly, the system can intelligently prompt operators with different selectable options when it comes to confirming, categorizing, or otherwise assigning attributes to items found in different body zones. If an object encountered in a body zone is atypical for that zone, or otherwise atypical for any zone, the operator can flag the object for follow-up. The operator can, e.g., recognize the object as harmless (e.g., a belt buckle) and flag the object as benign. The operator can then later follow-up and provide additional information, or otherwise interact with, the item using a touch screen tablet or typical computer display and mouse. For example, the operator can review camera footage and security scan results, then further specify that the object was a belt buckle of a particular style. Such follow-up enables the operator to perform a briefing post-scan, allowing the operator to fill in additional notes about the object. Such information further increases the system's intelligence, by incorporating such results and allowing the system to better recognize the real-world item corresponding to such scan results.

Figure 6:
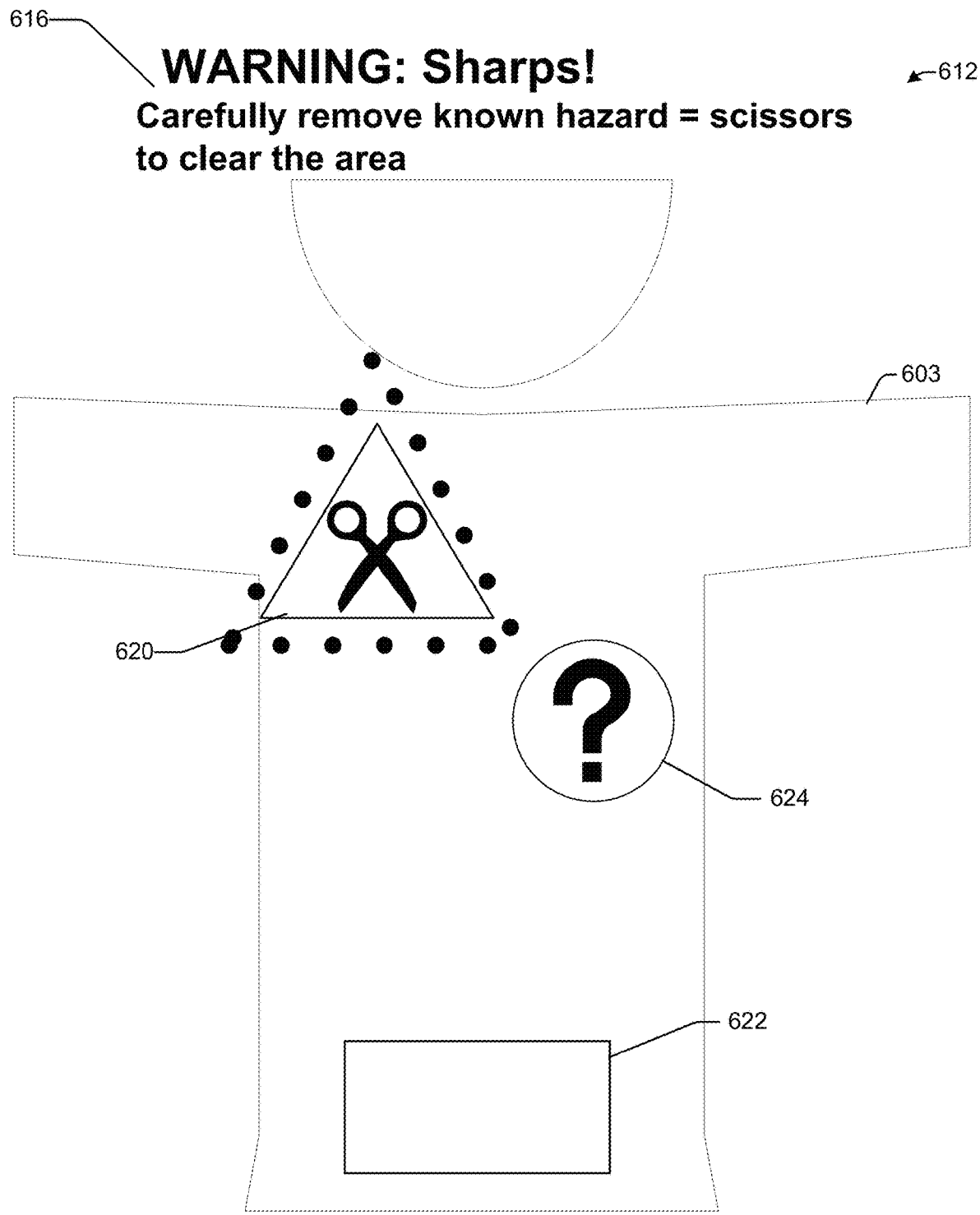
FIG. 6 illustrates an AR interface viewing a target with overlaid objects and guidance to enhance security screening according to an embodiment.

FIG. 6 illustrates an AR interface 612 viewing a target 603 with overlaid objects 620, 622, 624 and guidance 616 to enhance security screening according to an embodiment.

The AR interface 612 has recognized alarm object 620 as potentially dangerous, and proactively warns the user to be careful when removing the alarm object 620. Accordingly, safety is increased and user injuries are avoided, while increasing user confidence in the use of the AR interface 612.

Figure 7:
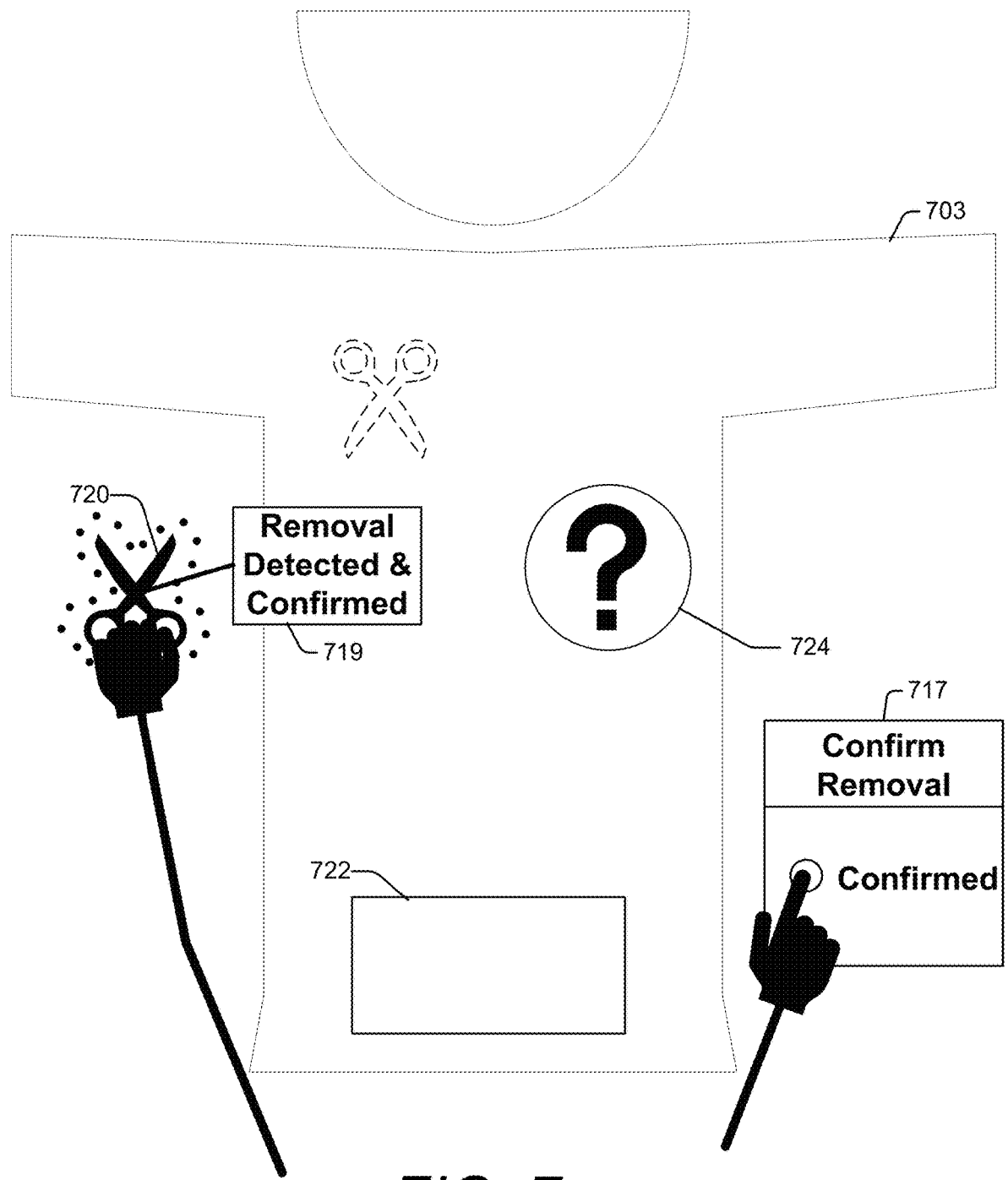
FIG. 7 illustrates an AR interface viewing a target with overlaid objects, a dialog, and a confirmation to enhance security screening according to an embodiment.

FIG. 7 illustrates an AR interface 712 viewing a target 703 with overlaid objects 720, 722, 724, a dialog 717, and a confirmation 719 to enhance security screening according to an embodiment.

The AR interface 712 is able to detect the real-world scissors when held and removed by the user, e.g., based on a headset camera integrated into the AR equipment worn by the user. Accordingly, the AR interface 712 provides 1) confirmation 719 that the alarm object 720 has been removed (thereby enabling the target 703 to pass safely through the security checkpoint), and 2) confirmation that the user 712 is successfully performing the actions associated with resolving the alarm issue. The AR interface 712 also provides dialog 717 requesting that the user independently provide confirmation that the user has safely removed and confiscated the alarm object 720. Such dialogs enable the AR interface 712 to maintain user engagement and vigilance of the user in carrying out procedures and protocols associated with security screening.

Figure 8:
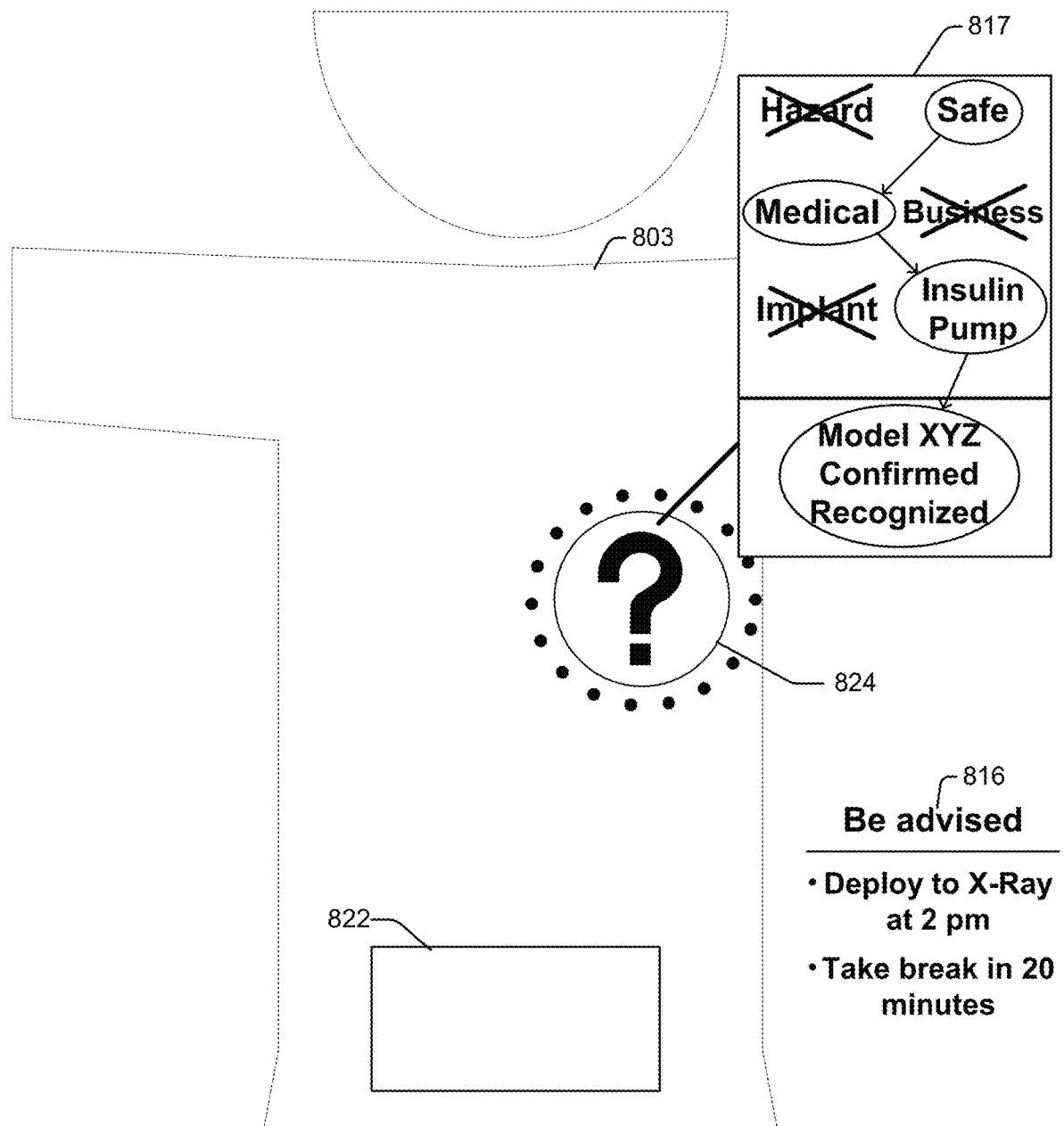
FIG. 8 illustrates an AR interface viewing a target with overlaid objects, guidance, and a dialog to enhance security screening according to an embodiment.

FIG. 8 illustrates an AR interface 812 viewing a target 803 with overlaid objects 822, 824, guidance 816, and a dialog 817 to enhance security screening according to an embodiment.

The AR interface 812 enables the user to navigate a detailed and complex dialog 817 on the fly in the field, without needing to stop and consult a procedure manual or supervisor. The dialog 817 provides simple streamlined guidance to the user to navigate to the outcome of properly classifying the unknown object 824 as a specific model of insulin pump, a safe medical equipment allowed to be carried by the target 803 through the security screening into the sterile zone of the travel venue.

The AR interface 812 can provide helpful guidance to the user that is not directly related to the particular target 803, but is helpful for the user in carrying out security operations. As illustrated, the guidance 816 serves as an advisory reminder to the user to report to a particular screening area at a specific time, as well as to take a break in 20 minutes. The AR interface 812 can thereby provide various guidance, dialogs, confirmations, and the like even if not directly related to screening a given target 803.

Embodiments of the system also convey instructional information, such as the next steps for the operator or passenger at any given point before, during, or after a resolution process. The system can provide a checklist of items, steps, or other information that the operator can refer to and interact with (e.g., check off items from the checklist). The system can recognize when the operator completes a given action, and update the checklist automatically. For example, the system can monitor the operator's progress during a pat down, to monitor whether the operator has touched all needed areas of the item or passenger. Once all needed areas have been patted down, the system can update the checklist, prompt the operator with a completion message, or otherwise provide an indication that the pat down is complete. In an embodiment, the system provides an interactive checklist, and the operator uses the AR interface to perform a gesture to check off an item from the checklist. The system can provide an indication as to the progress of a given step, such as a progress bar or by changing an appearance of an overlay or coloring of objects or passengers as displayed to the operator in the AR interface. For example, the system changes a color of those parts that the operator has already patted down, compared to a color of what parts remain to be patted down. Such indications clearly and efficiently show the operator his progress in a given process or checklist. For example, the system can indicate through the AR interface that three different areas need the operator's attention or patting down. The system can recognize that the officer touched all parts, and automatically check off the corresponding three separate steps in the to-do list which the system also displays on a side of the operator's view through the AR interface. Accordingly, the system helps the operator conduct different procedures, and serves as a fail-safe to ensure that the operator fully completes processes.

Embodiments of the system use the AR interface to provide workforce information, in addition to information related to security resolution processes. For example, the system can direct operators as to what location the system wants to deploy the operator to next. The system can advise the operator that it is time for the operator to take a lunch break, e.g., by automatically displaying such information as a notification that is visible to operator through the AR interface. For example, the system can advise the operator is to now perform a bag search, but next the operator should deploy to an X-ray station to perform X-ray imaging. Accordingly, embodiments of the system can be used to manage the workforce and workflow among the workforce. The system enables other operators to connect to a given operator's AR interface or headset. For example, a bomb expert can connect to the AR interface headset of a given operator who is involved in a process of encountering an explosive device at airport security. The bomb expert can be remote to the airport, and still connect into the AR headset, to guide the operator step-by-step on next steps. The bomb expert sees the view of the operator in real time, and can speak to the operator or annotate the operator's AR view (e.g., using a tablet or smartphone) as needed. For example, the expert uses a tablet remotely to circle an item that the operator is viewing through the AR interface, to guide the user what specific wire to touch next, and which wire to avoid cutting.

Figure 9:
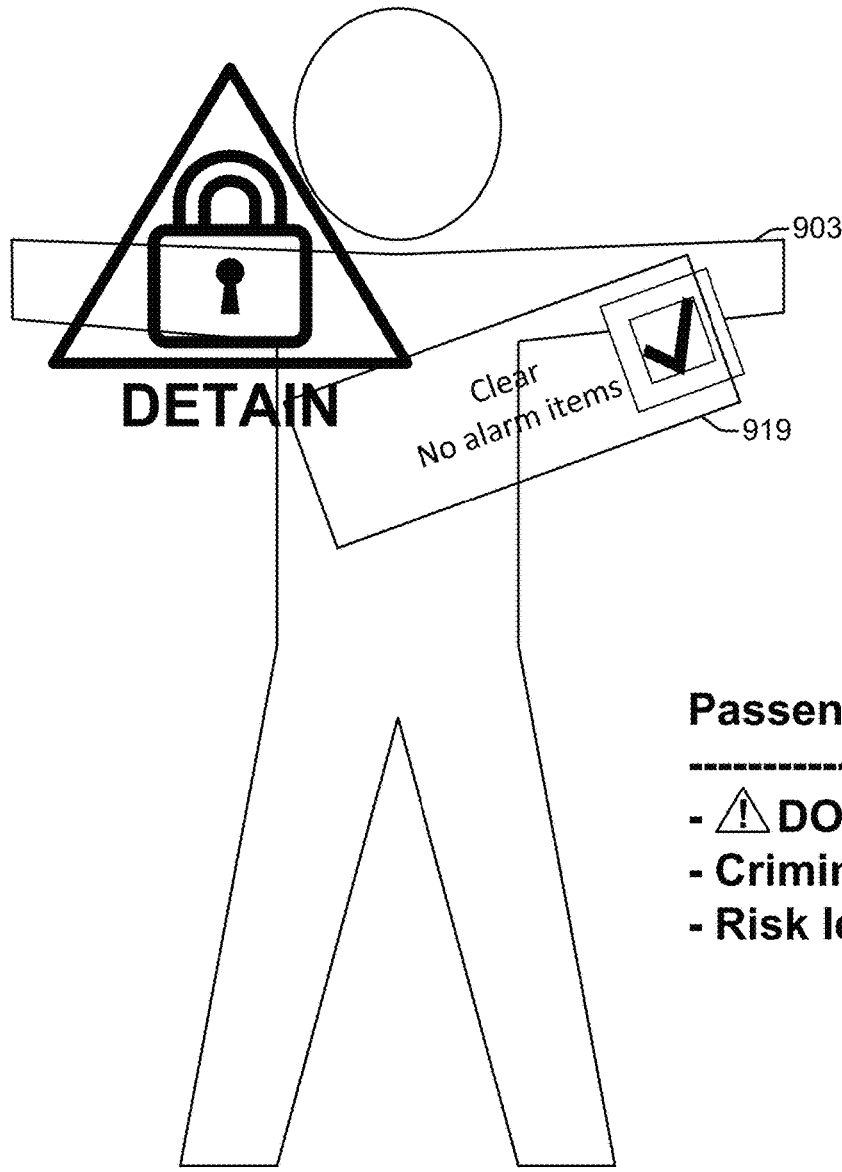
FIG. 9 illustrates an AR interface viewing a target with confirmation, guidance, and a dialog to enhance security screening according to an embodiment.

FIG. 9 illustrates an AR interface 912 viewing a target 903 with confirmation 919, guidance 916, and a dialog 917 to enhance security screening according to an embodiment.

The target 903 is associated with confirmation 919 as being clear of any alarm items, based on the scan results received from an AIT scanner. It would seem that the AIT scanner would have cleared the target 903 to proceed to the sterile side of the travel venue to, e.g., board an airplane. However, the illustrated embodiment consults passenger information (e.g., via network communication with a remote server as illustrated in FIG. 1) and determines that the target 903 is a high risk level and is on a "Do Not Fly" list with a criminal record. The AR interface 912 then advises that the target 903 should be detained. However, the guidance is provided discreetly to the user, who can casually notify authorities without tipping off the target 903 and thereby avoid escalating the situation until the authorities arrive and it is safe to detain the target 903 in a safe area.

The system can dynamically adjust which protocol the system advises to the operator as being appropriate for different situations. An embodiment adjusts protocols based on passenger risk. If a passenger is low risk, the system provides guidance to the operator to follow a low-risk resolution protocol (for the passenger, or for property, whether associated with that passenger or otherwise deemed low-risk). If the passenger is high risk, the system provides guidance as to a different protocol, such as a high-risk resolution protocol. Accordingly, the operator does not need to memorize an entire choice tree of multiple resolution protocols that might be used, and does not need to memorize all the steps of all the resolution protocols. Instead, the system interactively advises operators as to which specific protocol is appropriate for a given situation, and can interactively guide the operator through next steps of any protocol.

The system can provide operator guidance throughout various stages of the screening process generally, which can assist the operator when instructing passengers. Such guidance can include information about the passenger's risk status, and the system can tailor such guidance to provide divestment instructions based on risk status. The system can inform the operator as to which divestment position the passenger needs to assume to undergo a scan. The system can advise the operator if the passenger is a selectee, and how or where the operator should direct the passenger to undergo the next steps of the screening process. In an embodiment, the system uses AR to overlay an informative text bubble next to the passenger, provide a color coding around the passenger, or other indication to track the passenger.

The system's gesture control and interactive interface can also be used to allow the operator to request assistance. For example, the operator can encounter a passenger carrying a weapon. The operator then can request law enforcement support or supervisor support using gestures that are undecipherable to the passenger. Accordingly, the system provides non-verbal options for the operator to communicate, which do not alert the passenger. The system therefore protects the safety of the operator and minimizes opportunities for the passengers to react negatively or do harm.

Figure 10:
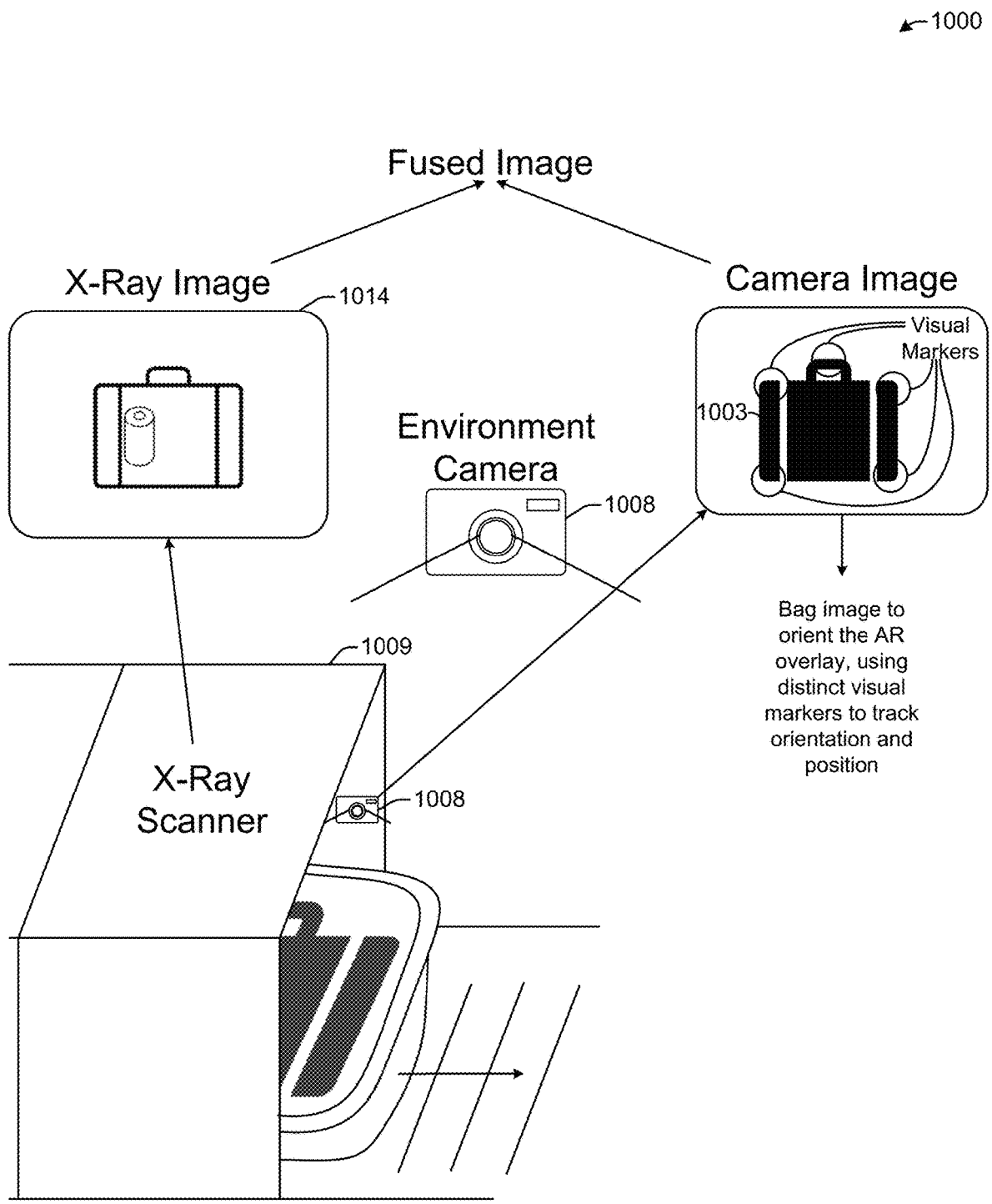
FIG. 10 illustrates a system including a target and a camera system to enhance security screening according to an embodiment.

FIG. 10 illustrates a system 1000 including a target 1003 and a camera system 1008 to enhance security screening according to an embodiment.

The system 1000 can create a fused image by using information from the X-ray scanner 1009 overlaid on a camera image from the camera system 1008 at the X-ray scanner. The system 1000 uses the camera image or fused image to apply visual recognition to identify visual markers on the target 1003. The system 1000 uses the visual markers to orient the AR overlay of the AR interface, and track orientation and position of the target as it moves around relative to the user who is using the AR interface to perform secondary screening of the target 1003.

The system uses a camera in or at the scanning equipment to capture an image or video of the passenger or baggage undergoing scanning. The captured image or video enables the system to identify the scanned orientation of the passenger or baggage, at the time of scanning (e.g., CT scan or HD-AIT to capture scanned data). The system can identify markers in the image or video, e.g., features that visually stand out in the baggage or passenger (including the passenger's clothing). In an embodiment, the system uses real-time pose detection to identify positions of a passenger's body parts. The system can assign a mapping between the visual markers or pose information and the scanning data (images, video, 3D renderings, and the like corresponding to data collected during security scanning). Accordingly, as the baggage or passenger moves around in an environment, the system can visually track (based on the visual markers, pose information, clothing, and the like) the orientation and position of the baggage or passenger. Visually tracking such information enables the system to use the tracked information to match-up the scanning data and orient the scanning data to properly overlay over the passenger or baggage when the operator views the scanning data and passenger or baggage through the system's AR interface.

Figure 11:
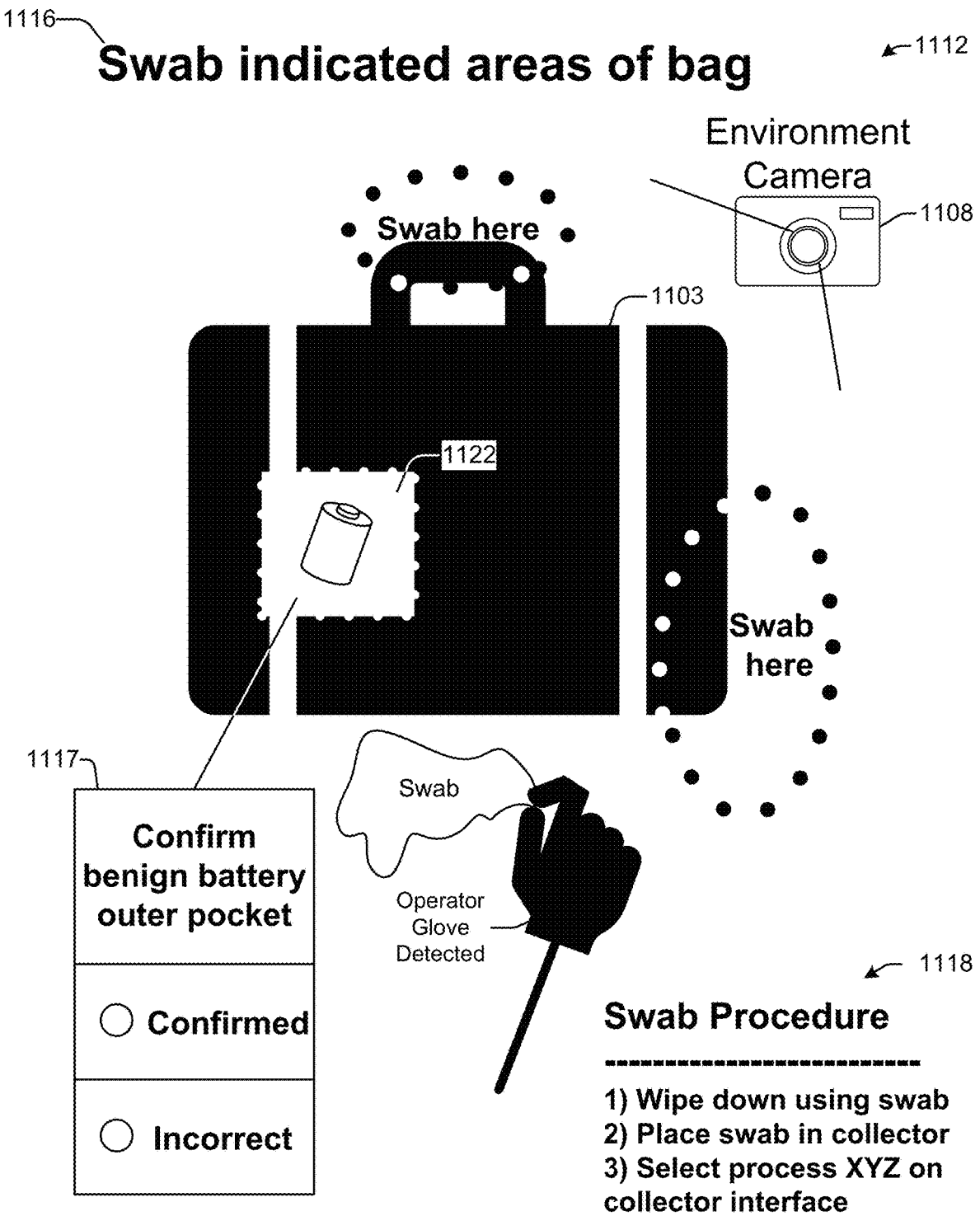
FIG. 11 illustrates an AR interface viewing a target with guidance, a dialog, and actions to enhance security screening according to an embodiment.

FIG. 11 illustrates an AR interface 1112 viewing a target 1103 with guidance 1116, a dialog 1117, and actions 1118 to enhance security screening according to an embodiment. Camera system 1108 monitors an environment including the target 1103 and actions carried out by the user, e.g., based on glove detection. The target 1103 includes a benign object 1122 that the AR interface 1112 has highlighted and prompted for user feedback via dialog 1117.

The AR interface 1112 uses the camera system 1108 to detect the user's glove and a swab, providing guidance 1116 for the user to perform the actions 1118 specific to highlighted areas of the target 1103. The AR interface 1112 also informs the user precisely which pocket the benign object 1122 is located in, requesting that the user confirm that the AR interface 1112 has properly identified the benign object 1122 as a battery in the outer pocket of the target 1103.

The system is used to enhance secondary screening. The system can generate and display an AR overlay onto property (e.g., travel bags) selected for secondary screening. The system configures the AR overlay to show specifically where an alarm object(s) is located on or in the property. For example, the AR overlay can highlight a specific pocket on an exterior of a travel bag, within which is contained an alarm item. Accordingly, the operator searches the correct pocket without wasting time searching every pocket, and retrieves the actual alarm item (which the system can verify) without inadvertently retrieving another item or leaving behind the alarm item.

The system is used to enhance handheld scanning of passengers or property. When an operator performs a scan using a handheld AIT scanner, the system generates the AR overlay to inform the operator and provide real-time feedback as to which portions of the passenger or property have yet to be scanned, what object(s) alarmed, what portions have already been scanned, and so on. The system visually aligns the AR overlay to the real-world passengers or property, including alarm objects that the operator encounters using the handheld scanner.

The system is used to enhance explosive trace detection (ETD), which involves an operator physically swabbing surfaces of the property or object in question, and inserting the swab into the ETD machine to test for residues. The system recognizes property, such as electronic devices contained in checked baggage, to identify which screening protocol is appropriate for the particular property. The system can verify or validate that an object the operator removes from the bag, such as a laptop computer, correctly matches the item which the system detected as needing the ETD procedure. For example, the system can visually analyze the laptop object, and can also prompt the operator with textual questions about the object to verify a match and confirm that the corresponding scanning protocol is appropriate for that object. The system uses the chosen scanning protocol to identify which specific surfaces of that property needs to be physically swabbed or sampled for analysis by the ETD machine. During the procedure, the system monitors the operator or the property to identify which portions of the property have been swabbed. The system maps an AR overlay onto the object and shows swabbing progress and completion. The system can provide information to the operator such as text prompts on how to conduct the swabbing, how to insert the swab into the ETD machine, and how to operate the ETD machine.

Figure 12:
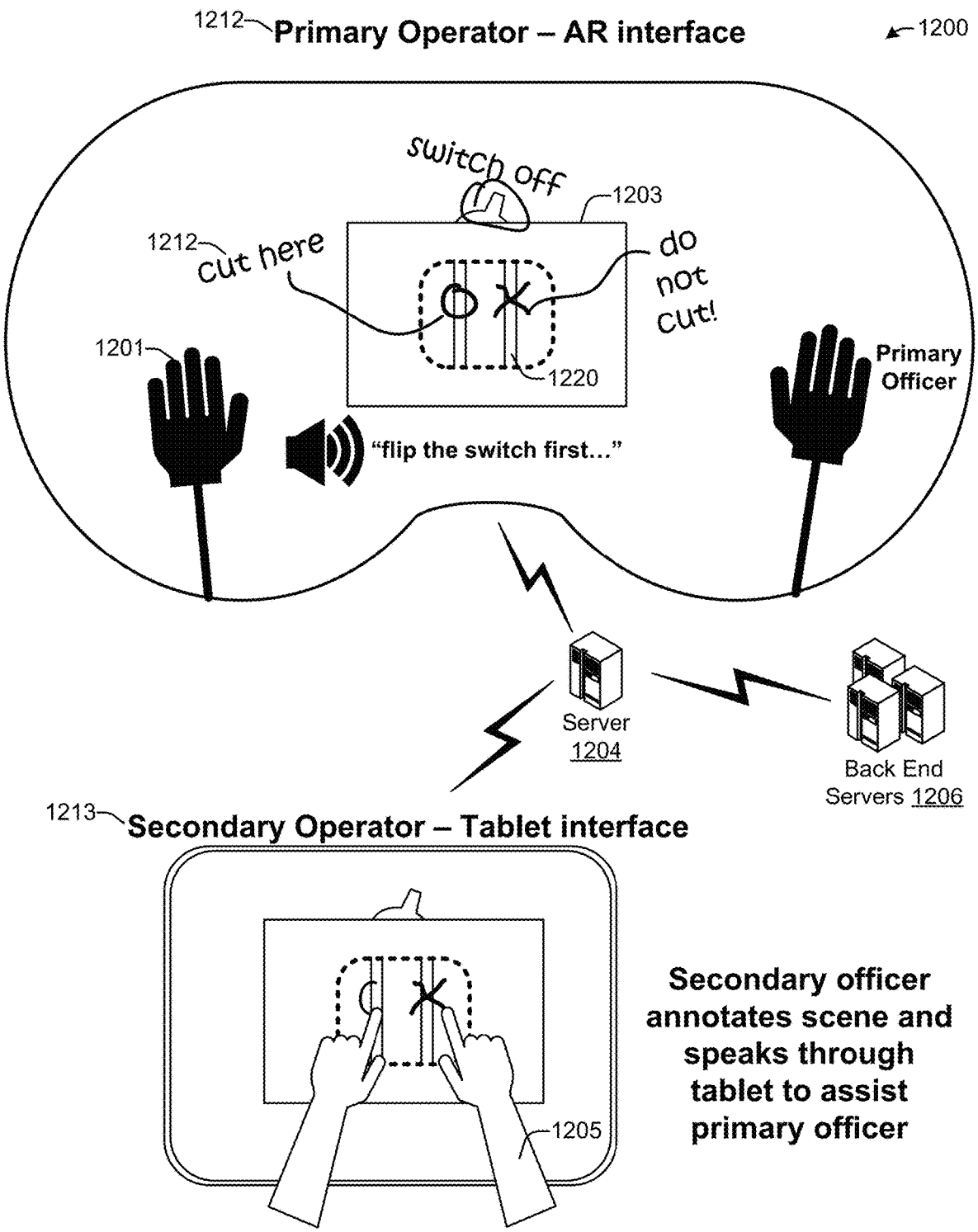
FIG. 12 illustrates a system including an AR interface with a first user viewing a target with an alarm object, and a tablet interface with a second user to enhance security screening according to an embodiment.

FIG. 12 illustrates a system 1200 including an AR interface 1212 with a first user 1201 viewing a target 1203 with an alarm object 1220, and a tablet interface 1213 with a second user 1205 to enhance security screening according to an embodiment. The AR interface 1212 and the tablet interface 1213 are in communication with each other via network 1202, to enable the first user 1201 and second user 1205 to communicate and exchange information. The AR interface 1212 and the tablet interface 1213 are also in communication with server 1204 and back end servers 1206, e.g., to access guidance 1216, scan results, dialogs, or other information relevant to the security scanning operations carried out by users.

The system 1200 enables an experienced second user 1205 to annotate the scene and "walk" the primary user 1201 through a given process. For example, the second user 1205 can be a supervisor or expert in bomb defusing located in a remote or central office who assists users working in airports across the world. The second user 1205 "sees" the view of the first user 1201 by using a tablet to view the security scenario as captured by the AR equipment of the first user 1201. The second user 1205 can annotate the scene, e.g., by using the tablet to illustrate, annotate, highlight, or otherwise mark up areas of the image that are overlaid on the AR interface as viewed by the first user 1203. The second user 1205 also can speak to the first user 1201 via voice. In other embodiments, the second user 1205 can use a laptop, smartphone, computer, or other device capable of exchanging information with the AR interface of the first user 1201, e.g., by using a network-connected computing device equipped with teleconferencing capabilities.

The system can provide the operator with specific or unique instructions, discretely through the AR headset. The system also can relay information that it collects, such as information the operator is viewing while interacting with the AR interface, to another operator. In an embodiment, the system is used by an operator who is a bomb technician. The system provides specific instructions to the operator from a source that is remote from the operator. For example, the system annotates features of what the operator is seeing through the AR headset, such as by providing feedback from another bomb disposal expert operator, including text overlay and highlights regarding particulars of a procedure the bomb technician is performing.

The system can duplicate the viewpoint from the operator to another AR interface, or to another interface that is not AR. For example, the system can relay the AR view of one operator to another operator using a conventional display such as a television, computer monitor, tablet, or smartphone. In an embodiment, the system relays the operator's view to a secondary operator holding a tablet to view the primary operator's viewpoint on the tablet. The system is configured to receive input from the secondary operator, e.g., speech or annotations input into the tablet, and relay that input to the AR interface viewpoint of the primary operator. Accordingly, the secondary operator with the tablet can speak into and write onto his tablet to annotate the primary operator's viewpoint. For example, a TSSC (explosives expert) can serve as the secondary operator to provide guidance and feedback to the primary operator using the AR interface. The secondary operator can use his tablet to view the device, as seen by the primary operator via VR. The secondary operator can use his tablet to circle a wire, and tell his tablet to "cut this wire." The system relays the annotation and speech to the primary operator through his AR interface. The primary operator then sees the AR system generate a circle overlaid on the viewpoint of the device that the primary operator is working on, as circled by the secondary operator. The primary operator also hears the secondary operator's voice instructions. Embodiments of the system enable multiple operators to collaborate and contribute to enhancing or assisting the AR interface as viewed by the primary operator. Similar approaches can be used for security screening, repair work, vehicular operations, and the like. Through augmented reality, the system enables any number of secondary operators to see and hear what the primary operator is seeing and hearing, and provide more specific instructions what to do next. The system enables the secondary operators to participate through their own AR headsets or other interfaces. The system enables the secondary operators to provide feedback using tablets to draw or otherwise provide visual annotations that are overlaid onto real-world objects as viewed by the primary operator through AR.

Figure 13:
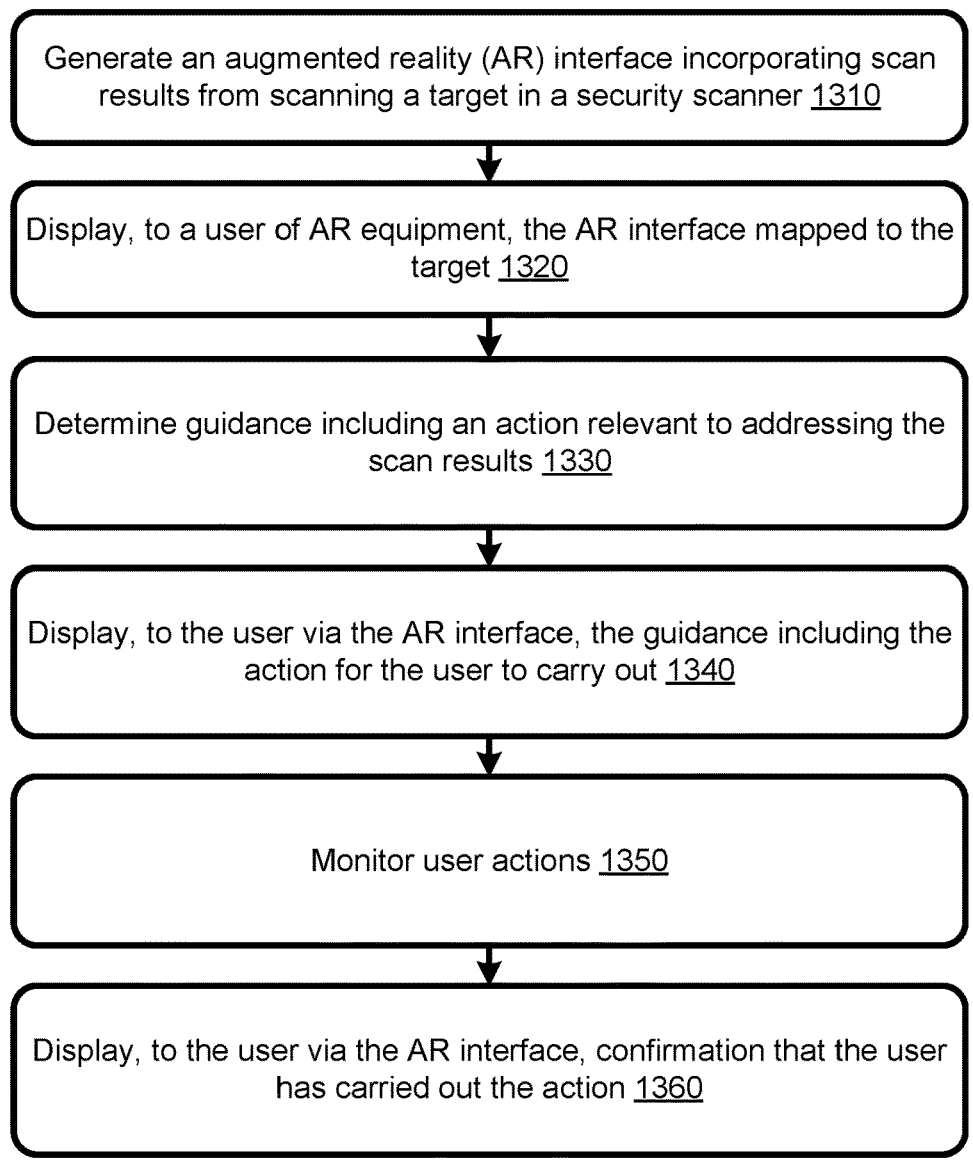
FIG. 13 illustrates a flowchart to enhance security screening according to an embodiment.

FIG. 13 illustrates a flowchart 1300 to enhance security screening according to an embodiment. The illustrated process allows for presenting alarm scan results to a user, such as an officer who performs secondary screening on targets including passengers and baggage. As shown at 1310, an augmented reality (AR) system generates an AR interface incorporating scan results from scanning a target in a security scanner. For example, the AR system is worn by a user performing secondary screening on passengers and baggage (targets) that have been scanned by a security system. The security system flags or alarms on the target for various reasons, to be resolved by the user at secondary screening. The security system can be an X-ray scanner, mmW scanner, or the like, which generates scan results that include information corresponding to the security scan of the target including an indication of an issue about the target that triggered an alarm, such as a prohibited item carried by the target. The AR system incorporates the scan results from the security system, to generate the AR interface while displaying the scan results oriented in the AR interface in a manner that is useful for the user.

The AR system at 1320 displays, to a user of AR equipment, the AR interface mapped to the target. For example, the AR system receives information about the environment by using a camera system including an environment camera to view the user and target, and using a headset camera built into the AR headset worn by the user to view the user's hands and the target. The AR system uses such information to orient rendering and display of the AR interface and scan results with respect to the viewpoint of the user as viewed through the AR equipment. The AR system recognizes the target and its orientation, and displays the AR interface to overlay the scan results onto the target corresponding to the real-world location of the scan results relative to the orientation of the target, enabling the user to intuitively recognize what part of the target the user should investigate or pat down.

The AR system at 1330 determines guidance including an action relevant to addressing the scan results. For example, the AR system accesses a database of protocols used for addressing security scanning issues, to find a protocol relevant to an object recognized by the security scanner in the scan results, or as recognized by the AR system using a camera system or feedback from the AR equipment. The guidance includes an action that the AR interface displays to the user, such as to instruct the user to carry out a pat down operation, which the AR interface can recognize by detecting the colored gloves worn by the operator.

The AR system at 1340 displays, to the user via the AR interface, the guidance including the action for the user to carry out. For example, the AR system displays text, a graphical element such as an overlay, a progress indicator, or other guidance for the benefit of assisting the user carrying out the secondary screening. The guidance can include an action that the user needs to carry out, such as an immediate action of where to pat down the target to clear an alarm item. The guidance or action can pertain to an immediate step for the user to carry out before carrying out other steps. The guidance or action can pertain to an overall protocol, such as listing a series of steps along with an introductory explanation and overview of the process involving the multiple steps. The guidance or action can also relate to employment concerns, such as advising the user to take an employment break soon, or redeploy from one secondary screening location of an airport to another for purpose of managing employee resources.

The AR system at 1350 monitors user actions. For example, the AR system uses object recognition to monitor a location of the user's hands. The AR system monitors whether the user's hands have overlapped with portions of the target that need to be patted down.

The AR system at 1360 displays, to the user via the AR interface, confirmation that the user has carried out the action. For example, the AR system displays a progress overlay over portions of the target that need to be patted down. As the user pats down the target, the AR system clears away portions of the progress overlay through which the user's hands have passed. The AR system uses the progress overlay to intuitively inform the user as to what portions of the target remain to be patted down. After patting down portions of the target corresponding to the overlay, the AR system clears the overlay and indicates (e.g., via text confirmation) that the pat down procedure is compete for the target.

Figure 14:
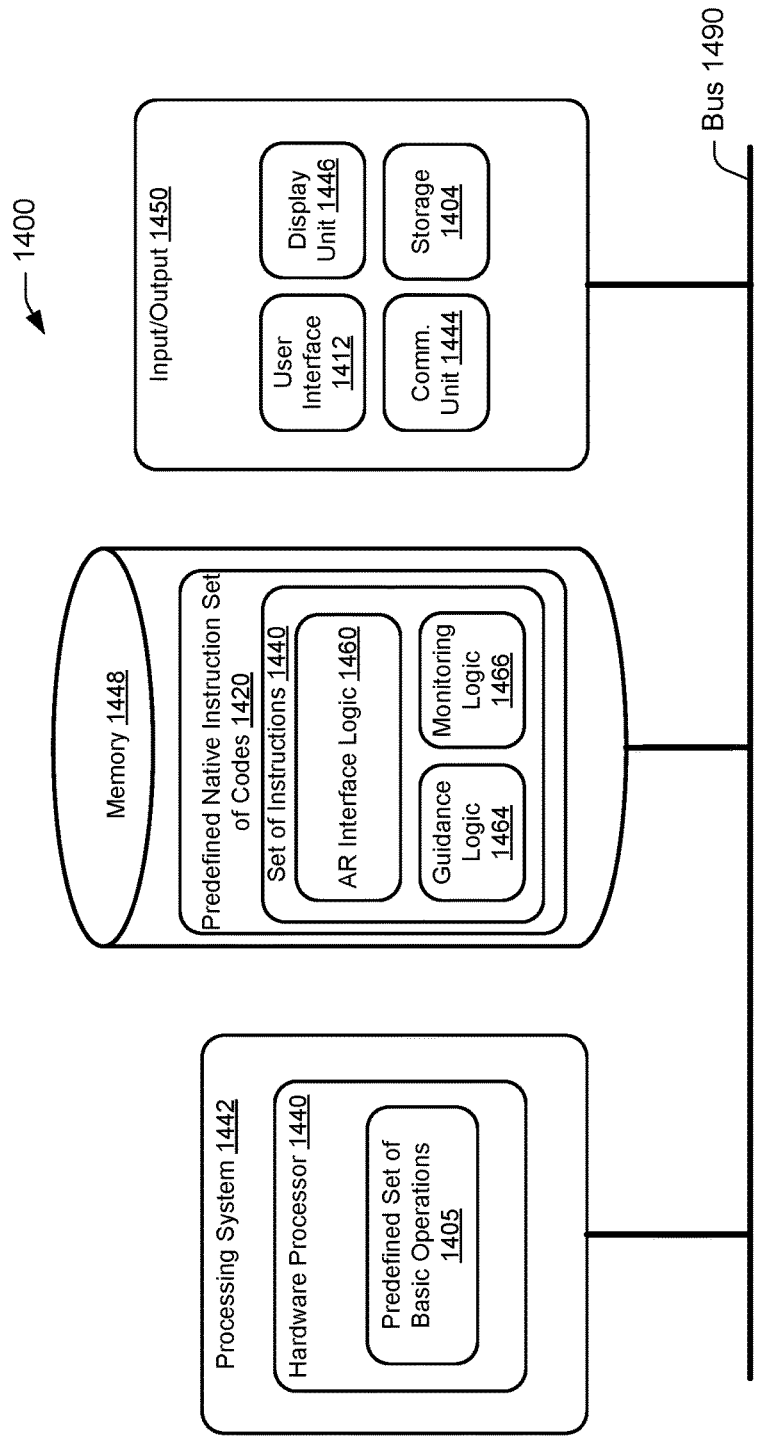
FIG. 14 illustrates a diagram of a computer system according to an embodiment.

FIG. 14 illustrates a diagram of a computer system according to an embodiment. The computer system 1400 includes a processing system 1442, memory 1448, and input/output module 1450 communicatively coupled via bus 1490. The processing system 1442 includes hardware processor 1440. The hardware processor 1440 includes predefined set of basic operations 1405. The memory 1448 includes predefined native instruction set of codes 1420. The predefined native instruction set of codes 1420 includes a set of instructions 1440. The set of instructions 1440 includes AR interface logic 1460, guidance logic 1464, and monitoring logic 1466. The input/output 1450 includes user interface 1412, display unit 1446, communication unit 1444, and storage 1404. In an embodiment, such components may serve as the computer system including the logic that carries out the methods described herein.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. To the extent any elements or steps are described as "optional," it does not indicate that all or any other elements or steps are mandatory.

What is claimed is:

1. A method to enhance security screening, comprising:
   generating an augmented reality (AR) interface incorporating scan results from scanning a target in a security scanner;
   displaying, to a user of AR equipment, the AR interface mapped to the target;
   determining guidance including an action relevant to addressing the scan results;
   displaying, to the user via the AR interface, the guidance including the action for the user to carry out;
   monitoring user actions; and
   displaying, to the user via the AR interface, confirmation that the user has carried out the action.

2. The method of claim 1, further comprising:
   creating a token corresponding to the target based on an identification and at least one of target characteristics or travel characteristics of the target such that the token is unique to the target;
   associating the token with the target;
   storing the token in a collection of tokens;
   retrieving the token, responsive to recognizing the target when the operator uses the AR interface to look at the target;
   accessing tokenized information contained in the token; and
   displaying the tokenized information to the user via the AR interface to assist the user in processing the target.

3. The method of claim 2, wherein the target includes a passenger target and at least one baggage target undergoing secondary screening, the method further comprising associating the token with the passenger target and the at least one baggage target, wherein the tokenized information displayed upon recognizing the passenger target or recognizing the baggage target includes information relevant to the passenger target and the baggage target.

4. The method of claim 1, further comprising:
   accessing a database of protocols used for addressing security scanning issues;
   selecting a protocol from the database of protocols tailored to address specific details of an object recognized by the security scanner in the scan results; and
   presenting at least one action from the protocol to the user via the AR interface.

5. The method of claim 1, further comprising:
   accessing a database of protocols used for addressing security scanning issues;
   selecting a protocol from the database of protocols relevant to an object recognized beyond a threshold confidence level by the AR system, using a camera system or feedback from the AR equipment; and
   presenting at least one action from the protocol to the user via the AR interface.

6. The method of claim 1, further comprising:
   recognizing a selection gesture from the user to select an object presented to the user in the AR interface;

accessing a database of protocols used for addressing security scanning issues correspond to the object, responsive to the selection gesture; and presenting, to the user via the AR interface, protocols relevant to the object.

7. The method of claim 1, further comprising:

recognizing a selection gesture from the user to select an object presented to the user in the AR interface;

presenting a dialog for the user to submit feedback for the object; and storing the feedback associated with the object.

8. The method of claim 7, wherein the dialog for the user comprises a plurality of labels configured for the user to perform a dragging gesture to drag a label to the object, to associate the label with the object.

9. The method of claim 1, wherein the guidance includes a progress indicator overlay that pertains to where to pat down the target to assist the user carrying out secondary screening.

10. The method of claim 9, further comprising monitoring whether hands of the user have overlapped with portions of the target that need to be patted down corresponding to the progress indicator overlay.

11. The method of claim 10, further comprising clearing away portions of the progress indicator overlay through which the hands of the user have passed to pat down the target, while continuing to display portions of the progress indicator overlay corresponding to portions of the target remaining to be patted down.

12. The method of claim 10, further comprising changing from a first color to a second color portions of the progress indicator overlay through which the hands of the user have passed to pat down the target, while continuing to display in the first color portions of the progress indicator overlay corresponding to portions of the target remaining to be patted down.

13. The method of claim 1, further comprising blurring at least a portion of the AR interface near a sensitive part of a body of the target, to respect privacy concerns while still indicating a location of an object of interest relative to the target.

14. The method of claim 1, further comprising:

applying pose detection to identify a body zone of the target proximate to an object in the scan results;

determining a privacy level of the body zone;

responsive to a first privacy level, displaying unobscured scan image data of the object in the AR interface; and responsive to a second privacy level, displaying altered scan image data of the object in the AR interface, sufficient to enable the user to discern details of the object while obscuring details of underlying portions of the target.

15. The method of claim 1, further comprising highlighting, in the AR interface, a body zone of the target corresponding to an object in the scan results to indicate to the user i) which body zone of the target to investigate for the object during secondary screening; and ii) which body zones of the target do not need investigation for the object.

16. The method of claim 1, further comprising highlighting, in the AR interface, an external pocket of the target corresponding to an object in the scan results to indicate to the user i) which external areas of the target to investigate for the object during secondary screening; and ii) which internal areas of the target do not need investigation for the object.

17. The method of claim 1, further comprising:

creating a fused image by overlaying scan results information from the security scanner onto a camera image captured from a camera system at the security scanner, wherein the target demonstrates a same orientation in the scan results information and camera image;

presenting the fused image to the user; and requesting feedback from the user regarding whether an alarm condition indicated in the scan results corresponds to a benign feature and therefore to treat the feedback as negative feedback discouraging future triggering under such circumstances in the future.

18. The method of claim 1, further comprising:

retrieving, from a Credential Authentication Technology (CAT) system that checks a boarding or identification (ID) of the target, details about the target that are relevant to security screening;

assigning a risk category to the target based on the details; and responsive to the risk category, adjusting the guidance displayed to the user consistent with an alarm resolution process suitable for the risk category assigned to the target.

19. The method of claim 1, further comprising:

retrieving, from an external database associated with security processing and containing information about targets regarding a no-fly list or a TSA precheck member, details about the target that are relevant to security screening;

assigning a risk category to the target based on the details; and responsive to the risk category, adjusting the guidance displayed to the user consistent with an alarm resolution process suitable for the risk category assigned to the target.

20. The method of claim 1, further comprising:

retrieving, from an external database associated with security processing, details about the target that are relevant to security screening;

assigning an age category to the target based on the details; and responsive to the age category, adjusting the guidance displayed to the user consistent with an alarm resolution process suitable for the age category assigned to the target.

21. The method of claim 1, further comprising:

determining that the scan results indicate an object is a known hazard;

identifying which instructional guidance corresponds to resolving the known hazard carried by the target; and displaying the instructional protocol including specific actions for the user to carry out to resolve the known hazard.

22. The method of claim 1, further comprising:

prompting, responsive to an alarm indication, the user with options to present to the target regarding alarm resolution;

directing the user to ask the target which option the target would prefer;

accepting from the user an option selection corresponding to a preference of the target; and responsive to the option selection, adjusting the guidance displayed to the user consistent with the option selection.

23. The method of claim 22, wherein the options for the target include asking the target for consent to reveal, to the user, scan imagery of an alarm area of the target for potentially resolving the alarm issue; asking the target for consent to physically touch the target for such resolution; and offering the target a private screening to carry out alarm resolution processes.

24. The method of claim 1, further comprising:
displaying, via the AR interface, the guidance to perform a swabbing procedure consistent with explosive trace detection (ETD);
highlighting, via the AR interface, specific portions of the target that need to be swabbed; and
displaying, via the AR interface, text overlays including instructions on how to perform swabbing actions.

25. The method of claim 1, further comprising:
displaying, via the AR interface, an interactive dialog interface prompting for user selection;
receiving a gesture from the user selecting an option responsive to the interactive dialog interface;
prompting, responsive to the user selecting an option, for additional user selections building on earlier user selections; and
advancing through additional user gesture responses and prompts for user selections to complete the interactive dialog interface consistent with a multi-action security screening procedure.

26. The method of claim 1, further comprising:
automatically identifying an object found on the target;
displaying an identification of the object to the user in the AR interface; and
interpreting lack of correctional feedback from the user as confirmation that the identification of the object is correct.

27. The method of claim 1, wherein the guidance comprises a visual checklist displayed to the user via the AR interface, the visual checklist including a plurality of actions for the user to check off using a gesture in the AR interface.

28. The method of claim 1, further comprising:
recognizing an assistance request gesture from the user to request assistance, the assistance request gesture being undecipherable to the target;
prompting the user to select a type of assistance; and
notifying a source of assistance corresponding to the type of assistance that the user selected.

29. A system to enhance security screening, comprising:
augmented reality (AR) equipment for use by a user to perform security screening on a target that has been scanned in a security scanner;
a camera system for monitoring an environment including the user and the target;
a computer system, including:
a processing system having a hardware processor configured to perform a predefined set of basic operations by loading corresponding ones of a predefined native instruction set of codes, the predefined native instruction set of codes constituting a set of instructions selectable for execution by the hardware processor;
a memory accessible to the processing system; and
an augmented reality (AR) interface controller under control of the processing system;
AR interface logic, stored in the memory, comprising a sequence of instructions selected from the predefined native instruction set of codes of the hardware processor, adapted to operate with the processing system and the AR interface controller to generate an AR interface adapted to incorporate scan results and display guidance for the user and confirmation of user actions;
guidance logic, stored in the memory, comprising a sequence of instructions selected from the predefined native instruction set of codes of the hardware processor, adapted to operate with the processing system to generate and display guidance for the user;
monitoring logic, stored in the memory, comprising a sequence of instructions selected from the predefined native instruction set of codes of the hardware processor, adapted to operate with the processing system to monitor actions carried out by the user;
a communication system, under control of the processing system, adapted to transmit information used by the AR interface logic, the guidance logic, and the monitoring logic;
the processing system being further configured to direct the AR interface logic, the guidance logic, and the monitoring logic to display the AR interface mapped to the target, determine guidance, display the guidance, monitor user actions, and display confirmation that the user has carried out the action.

30. A tangible non-transitory computer-readable medium having stored thereon computer-executable instructions that, if executed by a computing device, cause the computing device to:
generate an augmented reality (AR) interface incorporating scan results from scanning a target in a security scanner;
display, to a user of an AR interface, the AR interface mapped to the target;
determine guidance including an action relevant to addressing the scan results;
display, to the user via the AR interface, the guidance including the action for the user to carry out;
monitor user actions; and
display, to the user via the AR interface, confirmation that the user has carried out the action.

* * * * *